(12) United States Patent
Kondo et al.

(10) Patent No.: US 7,313,283 B2
(45) Date of Patent: Dec. 25, 2007

(54) IMAGE CODING APPARATUS

(75) Inventors: Satoshi Kondo, Kyoto (JP); Kojiro Kawasaki, Osaka (JP); Hideki Fukuda, Nara (JP); Kazuhiko Nakamura, Osaka (JP); Shiro Iwasaki, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 259 days.

(21) Appl. No.: 11/147,308

(22) Filed: Jun. 8, 2005

(65) Prior Publication Data

US 2005/0238243 A1 Oct. 27, 2005

Related U.S. Application Data

(62) Division of application No. 10/611,893, filed on Jul. 3, 2003, now Pat. No. 6,937,771, which is a division of application No. 09/588,186, filed on Jun. 7, 2000, now Pat. No. 6,625,322.

(30) Foreign Application Priority Data

Jun. 8, 1999 (JP) ................................. 11-160495
Apr. 10, 2000 (JP) ............................. 2000-107881

(51) Int. Cl.
*G06K 9/36* (2006.01)
(52) U.S. Cl. ...................................... 382/239
(58) Field of Classification Search ............... 382/232, 382/236, 238–240, 242, 248, 250; 348/384.1, 348/394.1–395.1, 400.1–404.1, 407.1–416.1, 348/420.1–421.1, 425.1; 375/240.02–240.03, 375/240.11–240.16, 240.18–240.2, 240.22, 375/240.25
See application file for complete search history.

(56) References Cited

U.S. PATENT DOCUMENTS

| | | | |
|---|---|---|---|
| 5,592,226 | A | 1/1997 | Lee et al. |
| 5,734,419 | A | 3/1998 | Botsford et al. |
| 5,737,022 | A | 4/1998 | Yamaguchi et al. |
| 5,754,700 | A | 5/1998 | Kuzma |
| 6,078,617 | A | 6/2000 | Nakagawa et al. |
| 6,160,844 | A | 12/2000 | Wilkinson |
| 6,259,733 | B1 | 7/2001 | Kaye et al. |
| 6,330,344 | B1 | 12/2001 | Kondo et al. |

(Continued)

FOREIGN PATENT DOCUMENTS

JP 08-149413 6/1996

(Continued)

*Primary Examiner*—Jose L. Couso
(74) *Attorney, Agent, or Firm*—Nixon & Peabody LLP; Donald R. Studebaker

(57) ABSTRACT

A video frame is input to a spectrum analyzer, which transforms the frame from a spatial domain into a frequency domain. A resolution determiner analyzes the output of the spectrum analyzer, thereby selecting a resolution appropriate for the video frame. Then, a resolution converter converts a resolution of the video frame into the resolution selected by the resolution determiner. Thereafter, the video frame is subjected to a coding process by block divider, DCT transformer, quantizer and variable-length coder so as to be output as a coded bit stream. By coding the input video frame at a resolution corresponding to the high-frequency component in the frame, a video of higher quality can be obtained with the bit rate reduced.

2 Claims, 28 Drawing Sheets

U.S. PATENT DOCUMENTS

| | | |
|---|---|---|
| 6,381,254 B1 | 4/2002 | Mori et al. |
| 6,400,768 B1 | 6/2002 | Nagumo et al. |
| 6,507,615 B1 | 1/2003 | Tsujii et al. |
| 6,510,176 B1 | 1/2003 | Fukuda et al. |
| 6,532,262 B1 | 3/2003 | Fukuda et al. |
| 6,625,322 B1 | 9/2003 | Kondo et al. |

FOREIGN PATENT DOCUMENTS

| | | |
|---|---|---|
| JP | 09-271026 | 10/1997 |
| JP | 10-215460 | 8/1998 |
| JP | 10-304381 | 11/1998 | resolution of input video signal resolution A resolution B resolution C

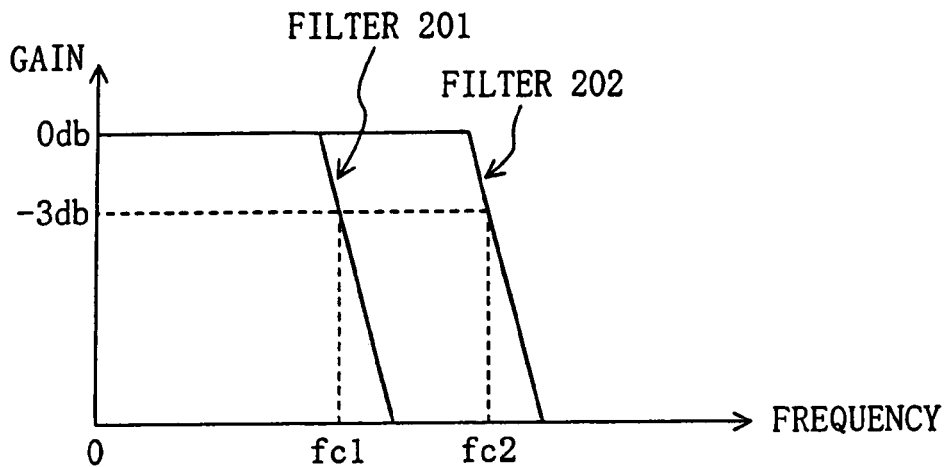
Fig. 8
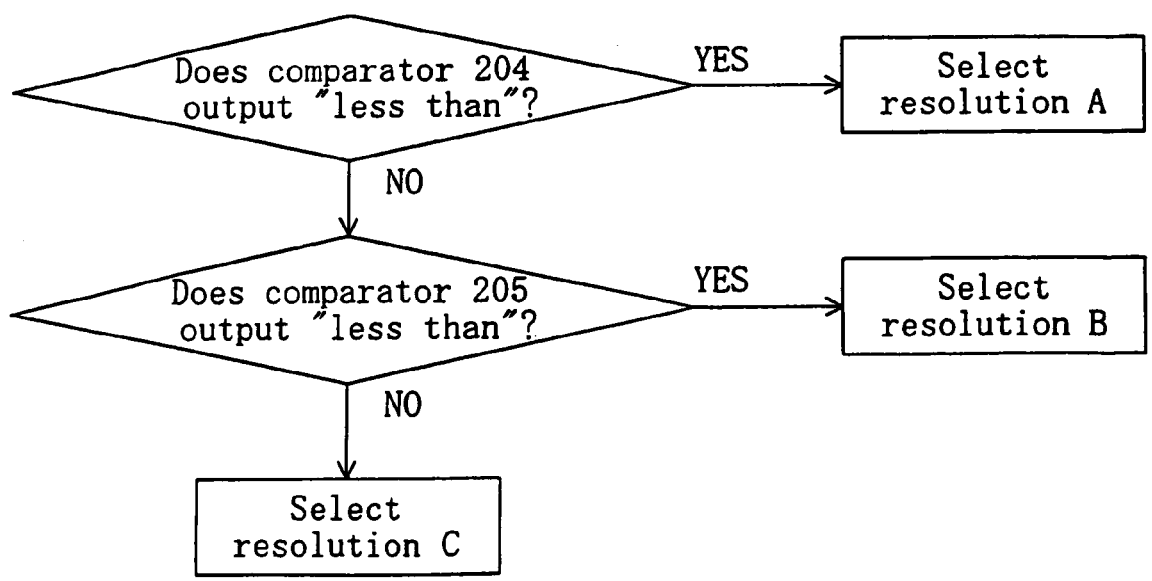

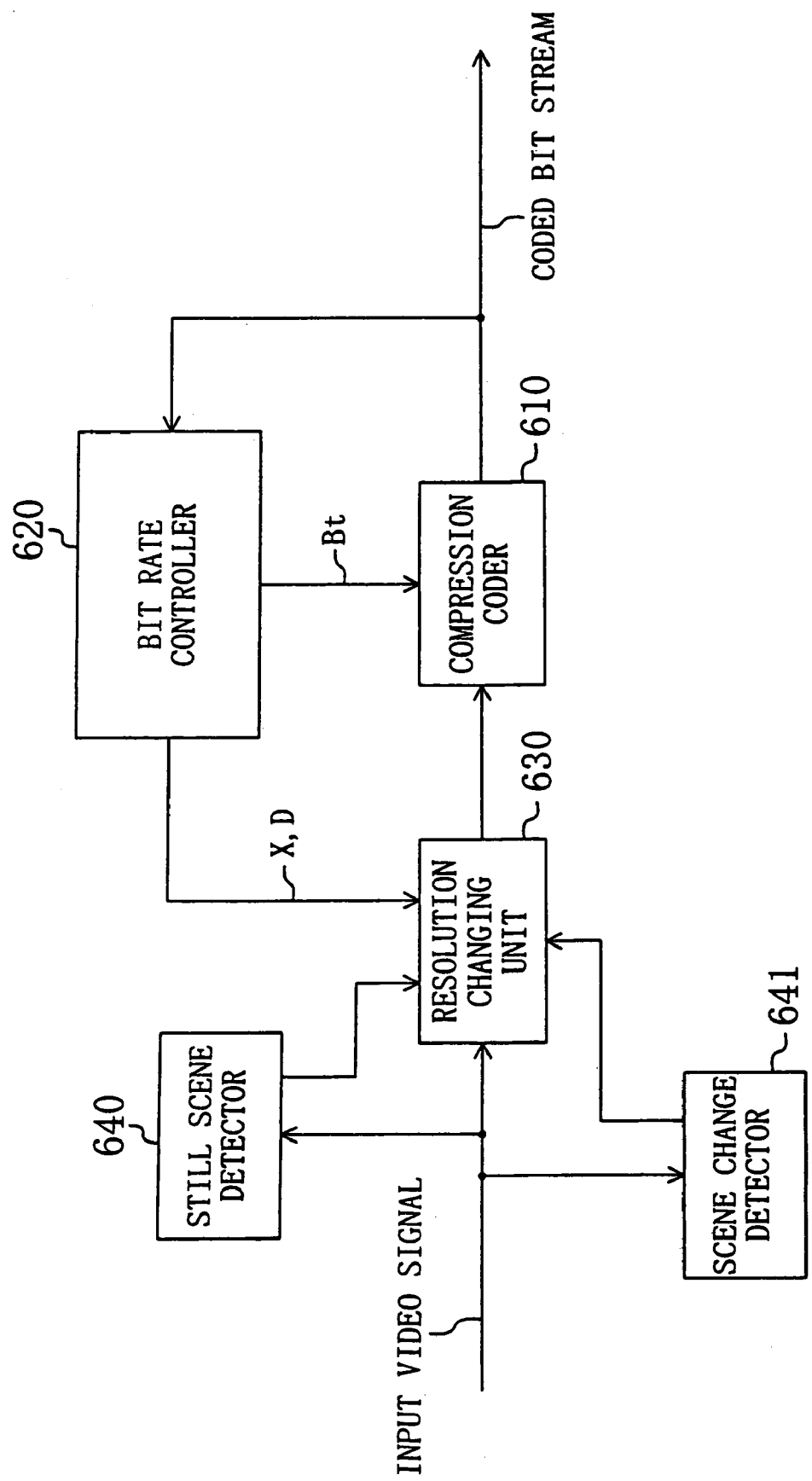

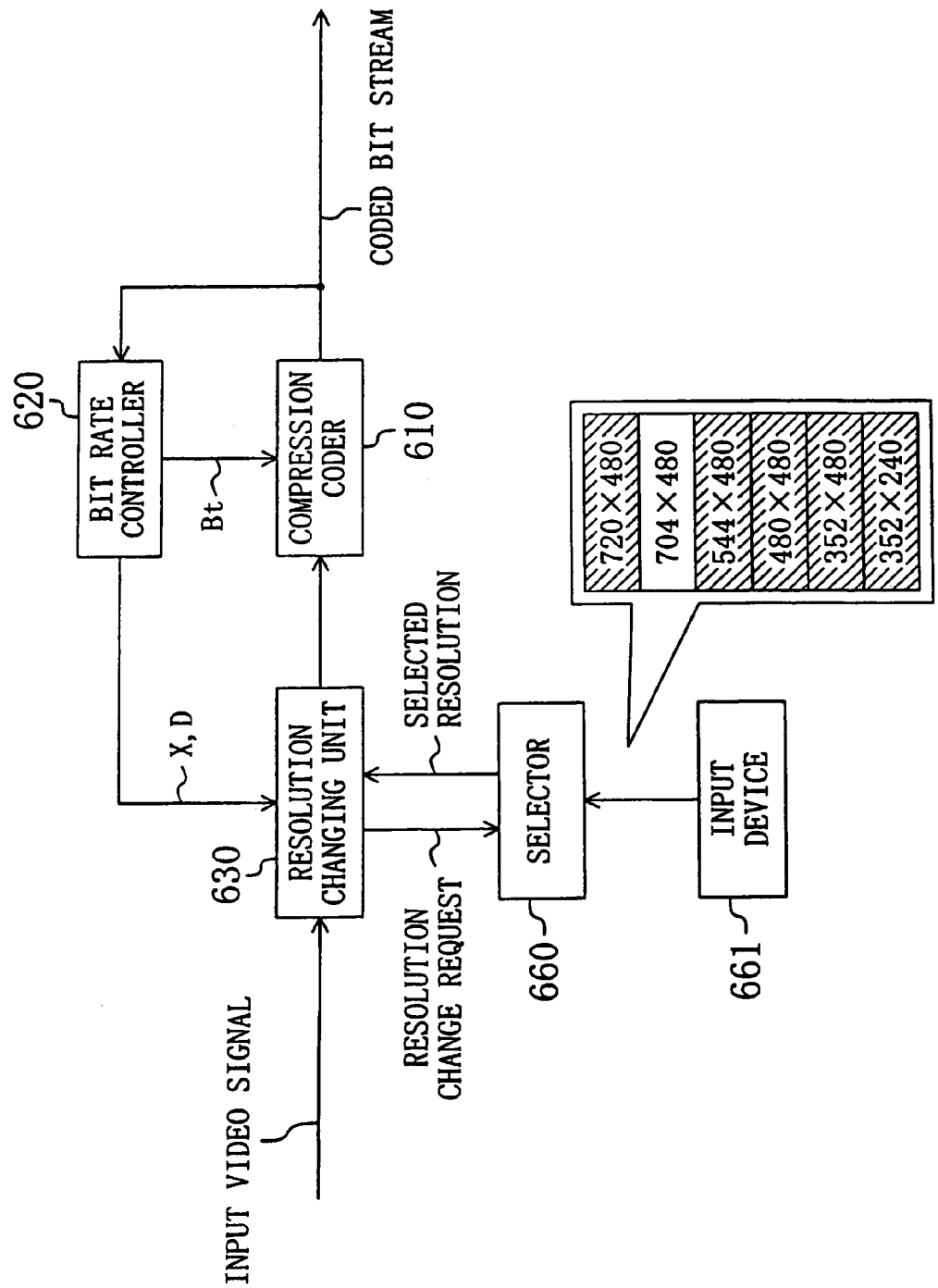

IMAGE CODING APPARATUS

This application is a divisional of U.S. application Ser. No. 10/611,893, filed Jul. 3, 2003, now U.S. Pat. No. 6,937,771, which is a divisional of U.S. application No. Ser. 09/588,186, filed Jun. 7, 2000, now U.S. Pat. No. 6,625,322.

BACKGROUND OF THE INVENTION

The present invention relates to an image coding apparatus for compressing and coding a video signal.

MPEG-2 is known as one of the high-efficiency video compression standards issued by Moving Picture Experts Group. In accordance with the MPEG-2 standard, each video frame (or field) is classified as an I, P or B frame. An I-frame is intra-frame coded using no reference frames. On the other hand, P- and B-frames are inter-frame predictively coded using some reference frames. Specifically, a P-frame is an abbreviation of a predictively coded frame, which is also called a "predicted frame". A B-frame means a bidirectionally coded frame, which is also called a "bidirectionally predicted frame". Each frame is also subdivided into a plurality of units called "macroblocks", each of which is composed of 16×16 pixels. And each frame is coded by being subjected to discrete cosine transform (DCT) on a block-by-block basis, where each block is composed of 8×8 pixels.

According to a technique disclosed in Japanese Laid-Open Publication No. 9-271026, when video with a relatively high coding complexity is input, the resolution of succeeding video signals is decreased to constantly control the number of binary bits generated per unit time at a predetermined number or less. This countermeasure is taken when either the product of a quantization scale (i.e., the magnitude of a unit quantization step) and the number of bits generated or an occupied buffer capacity is about to reach a certain limit. Thus, if the number of bits generated is going to exceed the predetermined number, the resolution must be decreased even if the input video signal contains a lot of high-frequency components. Accordingly, deterioration of image quality is unavoidable in such a situation.

SUMMARY OF THE INVENTION

It is therefore an object of the present invention to provide an image coding apparatus that can greatly cut down on the number of bits generated while minimizing the deterioration in image quality.

To achieve this object, the inventive apparatus adaptively changes the resolution according to the characteristics of an input video signal. In an exemplary embodiment of the present invention, a resolution for an input video signal is increased with respect to complicated input video with a relatively high coding complexity. Conversely, the resolution is decreased with respect to monotonous input video with a relatively low coding complexity. For further details, see the detailed description of the invention.

BRIEF DESCRIPTION OF THE DRAWINGS

FIG. 7 is a graph illustrating exemplary frequency characteristics of the two filters shown in FIG. 6.

FIG. 8 is a flowchart illustrating how the apparatus shown in FIG. 6 determines the resolution.

FIG. 22A illustrates a variation of coding complexity X with time;

FIG. 22B illustrates a variation of allocated bit number Bt with time; and

FIG. 22C illustrates a variation of cumulative error D with time.

FIG. 23A illustrates a variation of coding complexity X with time;

FIG. 23B illustrates a variation of allocated bit number Bt with time; and

FIG. 23C illustrates respective variations of cumulative errors D with time.

FIG. 24A illustrates a variation of coding complexity X with time;

FIG. 24B illustrates a variation of allocated bit number Bt with time; and

FIG. 24C illustrates respective variations of cumulative complexities AX with time.

FIG. 25 is a block diagram illustrating an image coding apparatus according to a seventh embodiment of the present invention.

FIG. 27A illustrates a normal GOP structure;

FIG. 27B illustrates a GOP structure in which a newly starting GOP is a closed GOP; and FIG. 27C illustrates a GOP structure in which a newly starting GOP begins with an I-frame.

FIG. 29 is a block diagram illustrating a modified example of the apparatus shown in FIG. 28.

DETAILED DESCRIPTION OF THE INVENTION

Hereinafter, embodiments of the present invention will be described with reference to the accompanying drawings.

Embodiment 1

Figure 1:
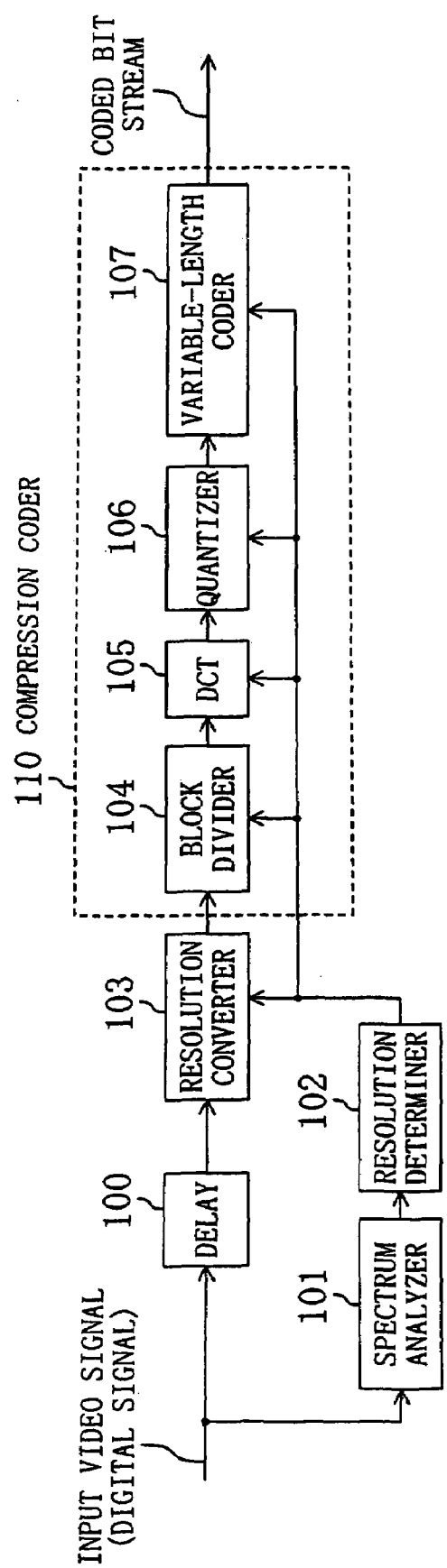
FIG. 1 is a block diagram illustrating an image coding apparatus according to a first embodiment of the present invention.

A first embodiment of the present invention will be described with reference to FIG. 1. FIG. 1 illustrates an image coding apparatus including delay device 100, spectrum analyzer 101, resolution determiner 102, resolution converter 103 and compression coder 110. The compression coder 110 is made up of block divider 104, DCT transformer 105, quantizer 106 and variable-length coder 107. A block arrangement, which is specially designed for intra-frame coding, is illustrated in FIG. 1 for the sake of simplicity.

First, a digital video signal is input to the spectrum analyzer 101. The spectrum analyzer 101 transforms a video frame from a spatial domain into a frequency domain, which is implementable by performing a Fourier transform on the video signal, for example. This transformation may be carried out either on the entire frame or on a block or macroblock basis by dividing each frame into multiple units that are approximately equal in size to blocks or macroblocks. Then, the spectrum analyzer 101 outputs a result obtained by transforming the video signal into the frequency domain.

The resolution determiner 102 analyzes the output of the spectrum analyzer 101, i.e., the video signal transformed into the frequency domain, thereby determining how to change the resolution (represented as the product of the number of pixels and the number of lines) of the video frame. Hereinafter, this resolution determining method will be described.

Figure 2A:
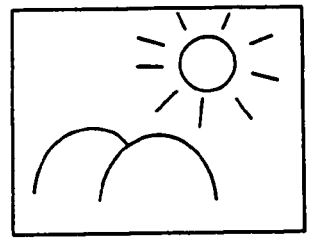
FIGS. 2A through 2D are schematic representations illustrating examples of selectable resolutions.
Figure 2B:
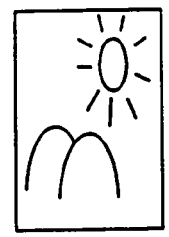
Figure 2C:
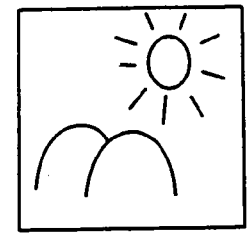
Figure 2D:
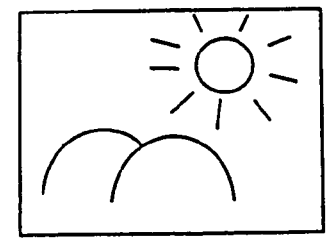

FIGS. 2A through 2D schematically illustrate exemplary selectable resolutions. In the illustrated example, one of the three resolutions A, B and C shown in FIGS. 2B, 2C and 2D, respectively, will be selected. Specifically, FIG. 2A illustrates the resolution of the input video frame. FIG. 2B illustrates the resolution A obtained by halving that of the input video frame horizontally. FIG. 2C illustrates the resolution B obtained by reducing that of the input video frame to three-quarters horizontally. And FIG. 2D illustrates the resolution C equal to that of the input video frame.

Figure 3:
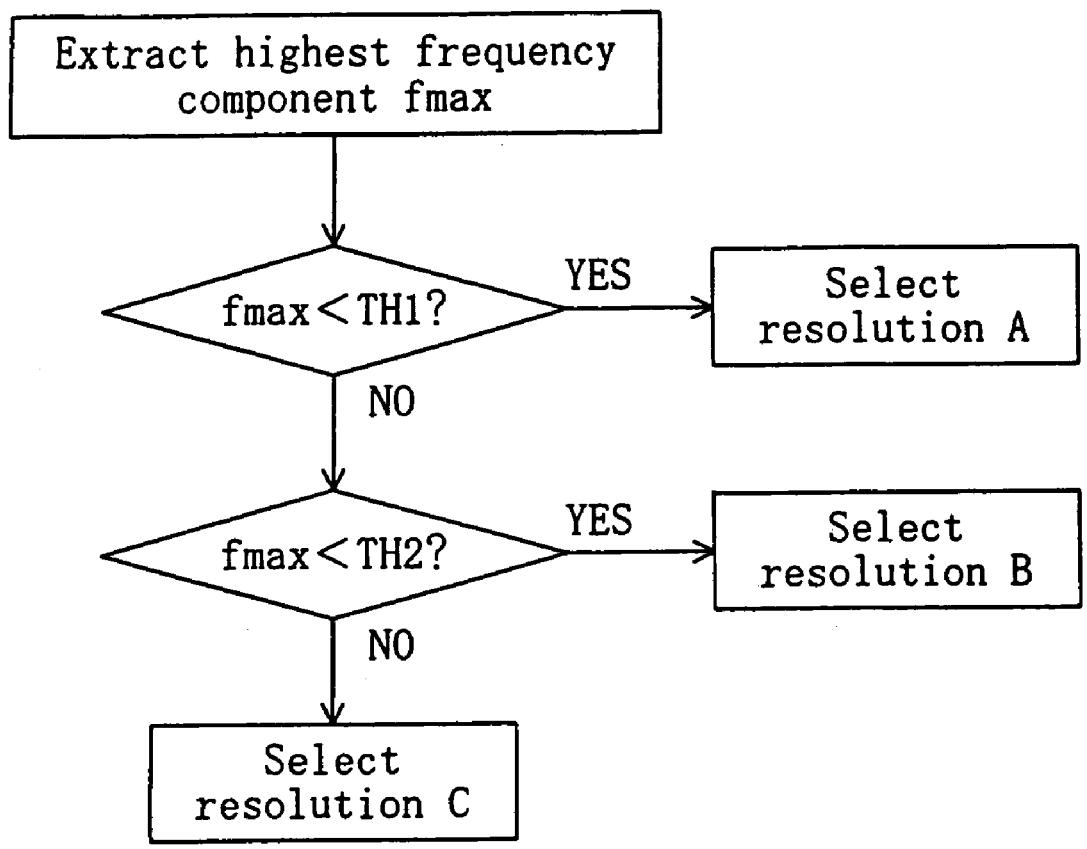
FIG. 3 is a flowchart illustrating how the apparatus shown in FIG. 1 determines the resolution.
Figure 4A:
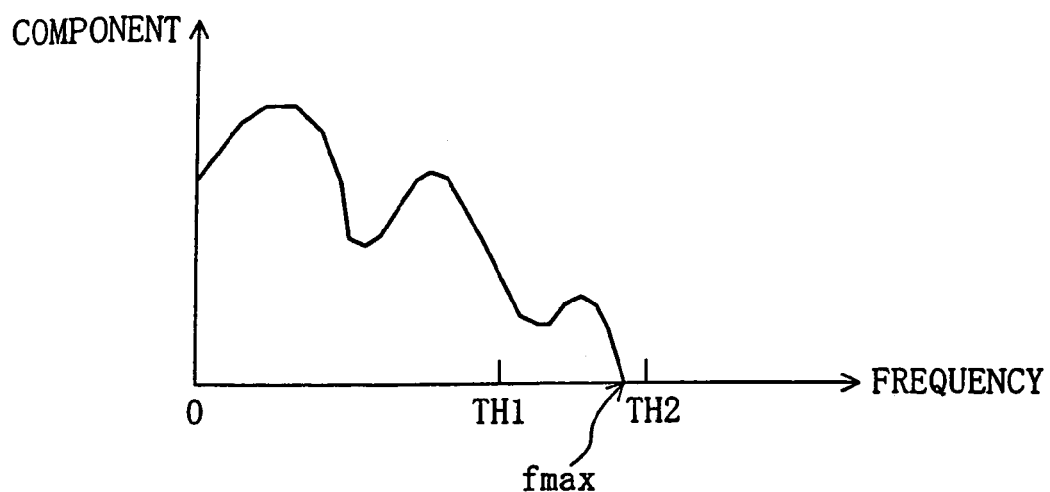
FIGS. 4A and 4B are graphs illustrating how to define the highest frequency component shown in FIG. 3.
Figure 4B:
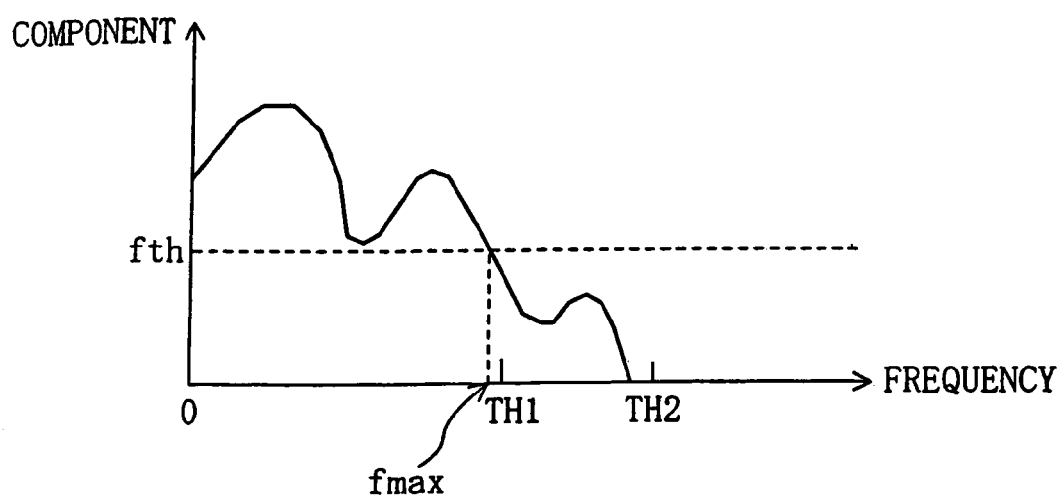

FIG. 3 illustrates how to determine the resolution. FIGS. 4A and 4B illustrate exemplary frequency components. The resolution determiner 102 determines the resolution using the flowchart illustrated in FIG. 3. First, the resolution determiner 102 extracts the highest frequency component fmax of the video frame that has been transformed into the frequency domain. If the spectrum analyzer 101 has performed the transformation on the entire frame, then fmax may be the maximum value of its frequency components. Alternatively, if the spectrum analyzer 101 has performed the transformation on a block or macroblock basis, then fmax may be the maximum value of the highest frequency component in each block or macroblock. Next, the determiner 102 compares fmax to a predefined threshold value TH1. If fmax is less than TH1, then the determiner 102 selects the resolution A. Otherwise, the determiner 102 compares fmax to another predefined threshold value TH2, which is greater than the threshold value TH1. If fmax is less than TH2, then the determiner 102 selects the resolution B. Otherwise, the determiner 102 selects the resolution C. When the output of the spectrum analyzer 101, i.e., the frequency components of the video signal, and the threshold values TH1 and TH2 are represented as in FIG. 4A, the determiner 102 selects the resolution B in accordance with the flowchart shown in FIG. 3. On the other hand, FIG. 4B illustrates fmax defined as the highest frequency in a range where the frequency component is equal to or greater than a predefined threshold value fth. In such a case, the determiner 102 selects the resolution A following the flowchart shown in FIG. 3.

The input video signal is also provided to the resolution converter 103 by way of the delay device 100. The delay device 100 is provided to delay the input video signal for the time needed for the spectrum analyzer 101 and the resolution determiner 102 to complete their processing. On the other hand, the resolution, which has been selected by the resolution determiner 102, is output to the resolution converter 103. In response, the resolution converter 103 carries out aliasing noise-reduction filtering on the video frame that has been provided via the delay device 100 and then converts the resolution through interpolation or decimation. For example, since the resolution B is selected for a video frame with the frequency components shown in FIG. 4A, the resolution converter 103 reduces the horizontal resolution of the original video to three-quarters. If the resolution C has been selected, however, the converter 103 outputs the original input video frame as it is.

The video frame, output from the resolution converter 103, is input to the block divider 104, which divides the frame into multiple blocks. Each block may have a size of 8×8 pixels. Then, these blocks are input to the DCT transformer 105, which performs two-dimensional DCT on each of these blocks, thereby transforming each block into a DCT coefficient block. The DCT coefficient block, which has been output from the DCT transformer 105, is input to the quantizer 106. The quantizer 106 rounds the coefficients by performing quantization thereon. Thereafter, the output of the quantizer 106 is variable-length coded by the variable-length coder 107 and then output as a coded bit stream. In the block divider 104, DCT transformer 105, quantizer 106 and variable-length coder 107, coding is also controlled based on the resolution determined by the resolution determiner 102.

In this manner, the image coding apparatus according to the first embodiment analyzes the frequency components contained in an input video signal to locate a frequency band where its highest frequency component belongs, thereby selecting a most appropriate resolution. In this case, the higher the maximum frequency component, the higher the resolution selected. Thereafter, the input video signal has its resolution converted into the resolution selected and then coded. Thus, the image coding apparatus according to the first embodiment can code input video at a resolution corresponding to the frequency components of the input video. That is to say, the number of blocks to be coded can be reduced depending on the frequency components of the input video. As a result, the number of bits generated can be greatly cut down with the deterioration of image quality suppressed.

In the foregoing embodiment, two threshold values TH1 and TH2 are defined for frequencies and one of the three resolutions A, B and C is selected by reference to these threshold values. Alternatively, any other number of threshold values may be defined for various frequencies and an arbitrary number of resolutions may be used instead.

Figure 5:
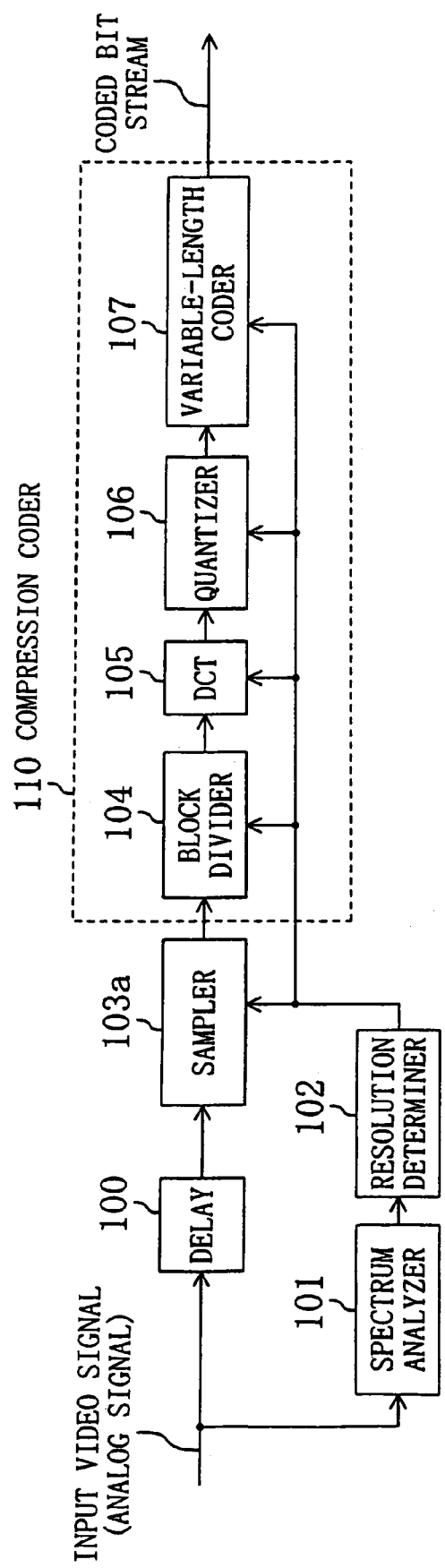
FIG. 5 is a block diagram illustrating a modified example of the apparatus shown in FIG. 1.

FIG. 5 illustrates a modified example of the apparatus shown in FIG. 1. The modified example shown in FIG. 5 is different from the embodiment shown in FIG. 1 in that an analog video signal is input to the apparatus shown in FIG. 5. For that reason, the resolution converter 103 shown in FIG. 1 is replaced with a sampler 103a. In FIG. 5, the resolution, selected by the resolution determiner 102, is output to the sampler 103a. In response, the sampler 103a samples the input video frame, which has been input via the delay device 100, at a sampling frequency corresponding to the resolution selected. In performing sampling, the sampler 103a carries out aliasing noise-reduction filtering associated with the sampling frequency. For example, according to CCIR REC. 601 standard, a luminance signal in an NTSC composite color signal should be sampled horizontally at a sampling frequency of 13.5 MHz. Thus, if the resolution C has been selected, the sampler 103a performs sampling at 13.5 MHz. Suppose the resolution B has been selected, the sampler 103a reduces the sampling frequency to 10.125 MHz. And the sampling frequency is further reduced to 6.75 MHz for the resolution A selected. In any case, the sampler 103a outputs the sampled video signal as a digital signal. Thereafter, the block divider 104, DCT transformer 105, quantizer 106 and variable-length coder 107 will operate in the same way as their counterparts shown in FIG. 1.

Embodiment 2

Figure 6:
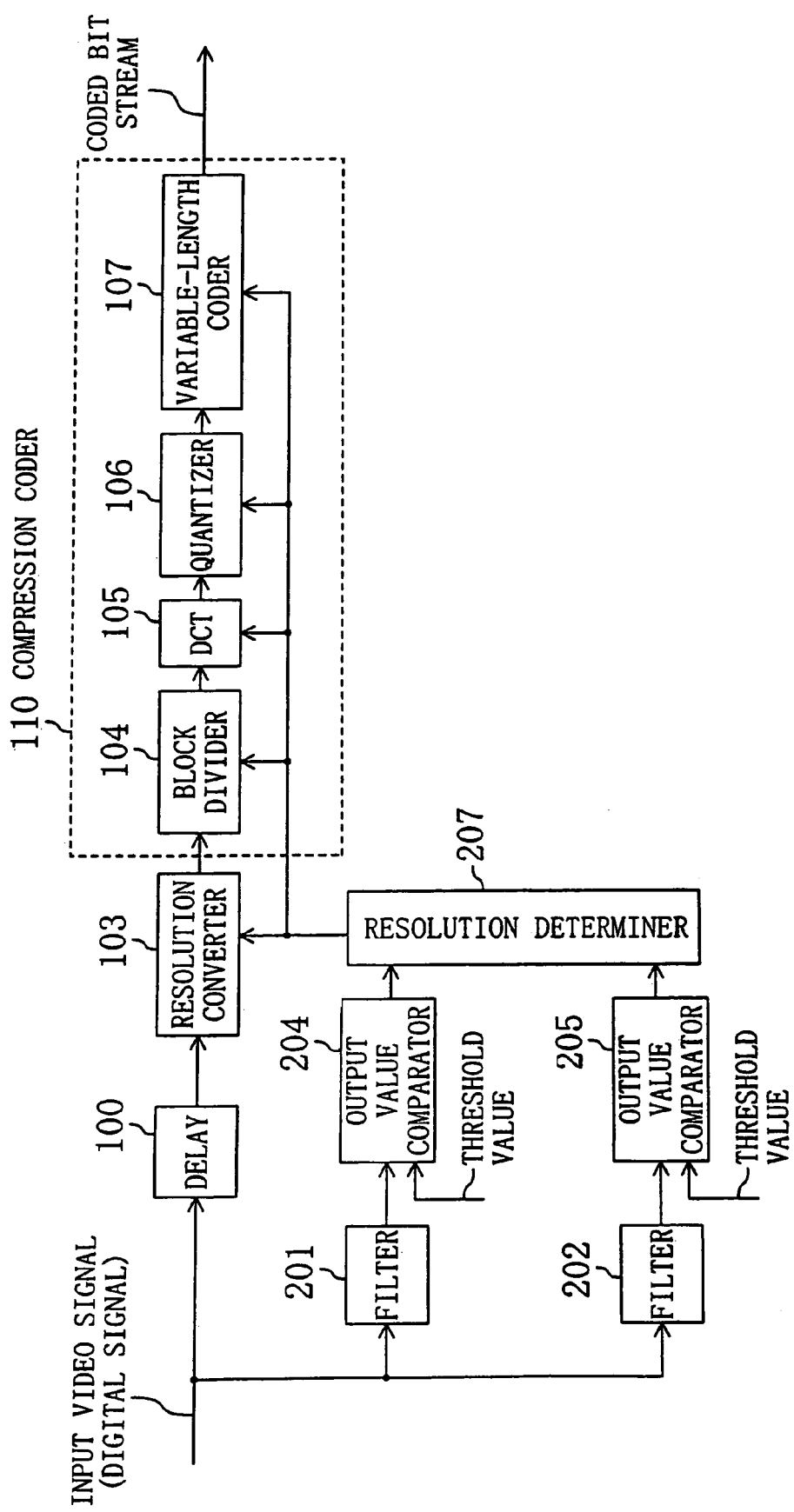
FIG. 6 is a block diagram illustrating an image coding apparatus according to a second embodiment of the present invention.

A second embodiment of the present invention will be described with reference to FIG. 6. FIG. 6 illustrates an image coding apparatus including delay device 100, filters 201, 202, output value comparators 204, 205, resolution determiner 207, resolution converter 103 and compression coder 110.

First, a digital video signal is input to the filters 201 and 202, which are low-pass filters with mutually different cutoff frequencies. FIG. 7 illustrates exemplary frequency characteristics of the filters 201 and 202. As shown in FIG. 7, the cutoff frequency fc2 of the filter 202 is higher than that fc1 of the filter 201 in the illustrated example. The outputs of the filters 201 and 202 are input to the output value comparators 204 and 205, respectively.

Receiving these filtered outputs, the comparators 204 and 205 calculate the respective energy values of the filtered output signals, compare these energy values to a predefined threshold value and then output the comparison results to the resolution determiner 207. In this case, if the filtered output is greater than the threshold value, the comparator 204 or 205 outputs "greater than". Otherwise, the comparator 204 or 205 outputs "less than".

Based on the comparison results provided from the comparators 204 and 205, the resolution determiner 207 selects a most appropriate resolution for the input video frame. In the illustrated example, one of the three resolutions A, B and C shown in FIGS. 2B, 2C and 2D, respectively, will be selected as in the first embodiment. FIG. 8 illustrates how to determine the resolution.

As shown in FIG. 8, if the comparison result provided from the comparator 204 is "less than", then the resolution determiner 207 selects the lowest resolution A. Alternatively, if the comparison results provided from the comparators 204 and 205 are "greater than" and "less than", respectively, then the determiner 207 selects the resolution B. Furthermore, if the comparison result provided from the comparator 205 is "greater than", then the determiner 207 selects the resolution C. That is to say, if at least one of the output values of the filters 201 and 202 is greater than the predefined threshold value, then the resolution is selected such that the higher the cutoff frequency of the filter, the higher the resolution.

The resolution, which has been selected by the resolution determiner 207, is output to the resolution converter 103. In response, the converter 103 carries out aliasing noise-reduction filtering on the video frame that has been provided via the delay device 100 and then converts its resolution through interpolation or decimation. The video frame, which has been output from the converter 103, is transformed into a coded bit stream by the compression coder 110.

In this manner, the image coding apparatus according to the second embodiment performs low-pass filtering on an input video signal at mutually different cutoff frequencies, and compares these filtered outputs to a predefined threshold value. If the output value of at least one of the filters is greater than the threshold value, then the resolution is selected such that the higher the cutoff frequency of the filter, the higher the resolution. And the input video signal has its resolution converted into the resolution selected, and then coded. Thus, the apparatus according to the second embodiment can code input video at a resolution corresponding to the frequency components of the input video. That is to say, the number of blocks to be coded can be reduced depending on the frequency components of the input video. As a result, the number of bits generated can be greatly cut down with the deterioration of image quality suppressed.

In the foregoing embodiment, one of the three resolutions A, B and C is selected using the filters 201 and 202 with two mutually different cutoff frequencies. Alternatively, any other number of filters may be provided and any arbitrary number of resolutions may be used instead.

Figure 9:
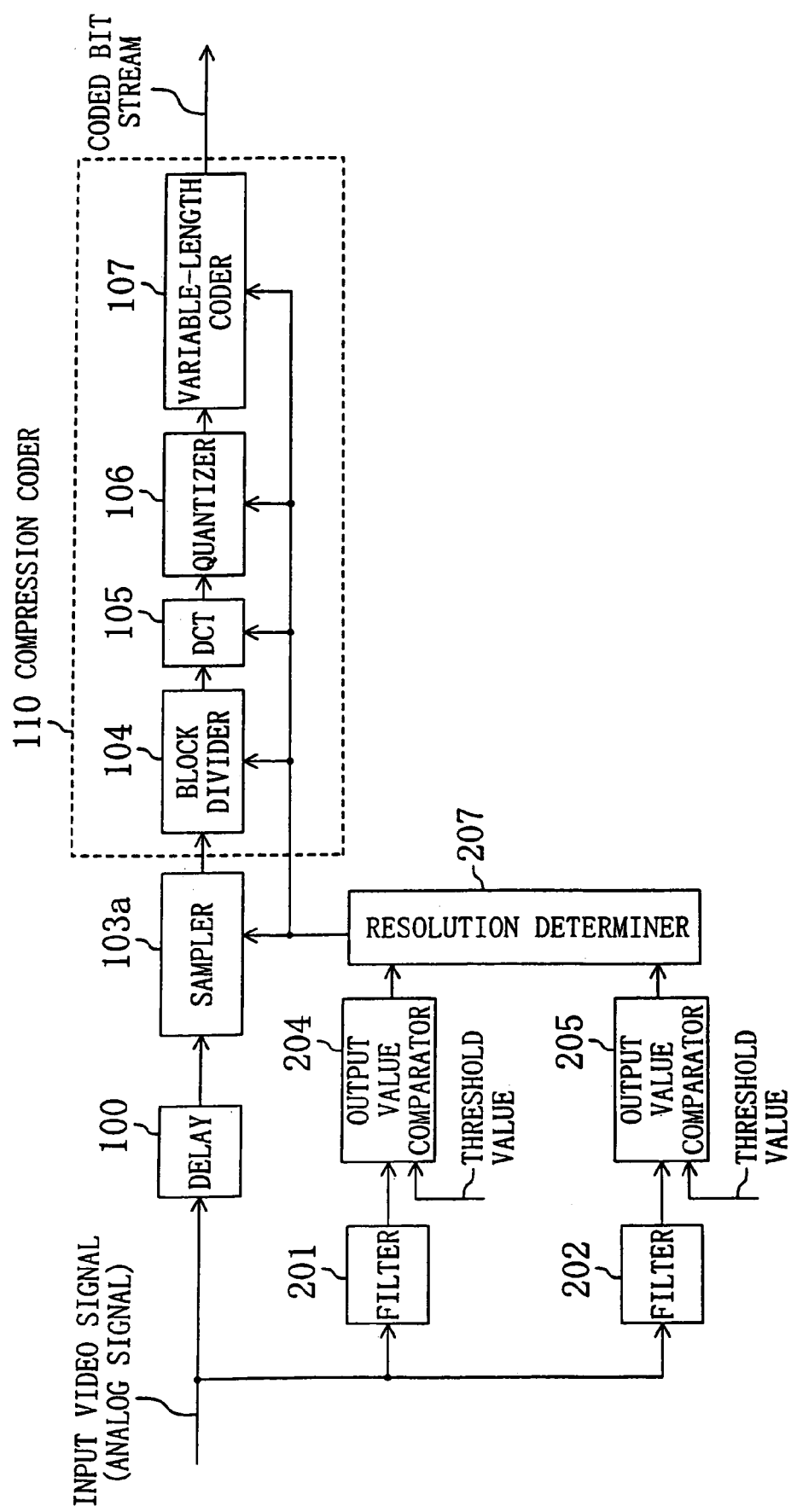
FIG. 9 is a block diagram illustrating a modified example of the apparatus shown in FIG. 6.

FIG. 9 illustrates a modified example of the apparatus shown in FIG. 6. The modified example shown in FIG. 9 is different from the embodiment shown in FIG. 6 in that an analog video signal is input to the apparatus shown in FIG. 9. For that reason, the resolution converter 103 shown in FIG. 6 is replaced with a sampler 103a. In FIG. 9, the resolution, which has been selected by the resolution determiner 207, is output to the sampler 103a. In response, the sampler 103a samples the input video frame, which has been input via the delay device 100, at a sampling frequency corresponding to the resolution selected, and then outputs a digital video signal to the compression coder 110.

Embodiment 3

Figure 10:
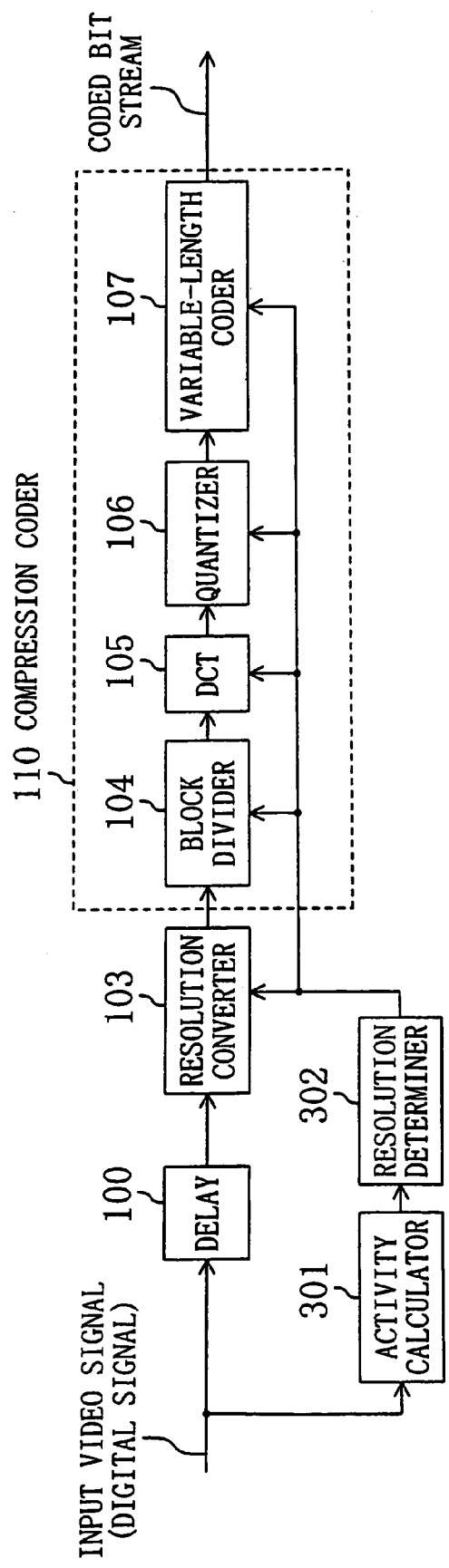
FIG. 10 is a block diagram illustrating an image coding apparatus according to a third embodiment of the present invention.

A third embodiment of the present invention will be described with reference to FIG. 10. FIG. 10 illustrates an image coding apparatus including delay device 100, activity calculator 301, resolution determiner 302, resolution converter 103 and compression coder 110.

First, a digital video signal is input to the activity calculator 301, which calculates the activity of the video frame. As used herein, the "activity" means a variance of pixel values within a frame. Suppose a frame composed of a number N of pixels arranged in the number N of lines, in which i is a horizontal pixel location, j is a vertical pixel location and Pij is a pixel value. In this case, a mean Pm and a variance var are given by $$Pm=(1/N^2)\Sigma\Sigma Pij$$

$$var=(1/N^2)\Sigma\Sigma(Pij-Pm)^2$$

where $\Sigma\Sigma$ is an operation of obtaining a sum of squared deviations from the mean Pm with respect to i between 0 and N−1 and to j between 0 and N−1. Then, the activity calculator 301 outputs the activity calculated. Optionally, the activity may also be a variance of pixel values within a macroblock or block.

Using the activity value output from the activity calculator 301, the resolution determiner 302 determines how to change the resolution of the video frame. Hereinafter, this resolution determining method will be described.

Figure 11:
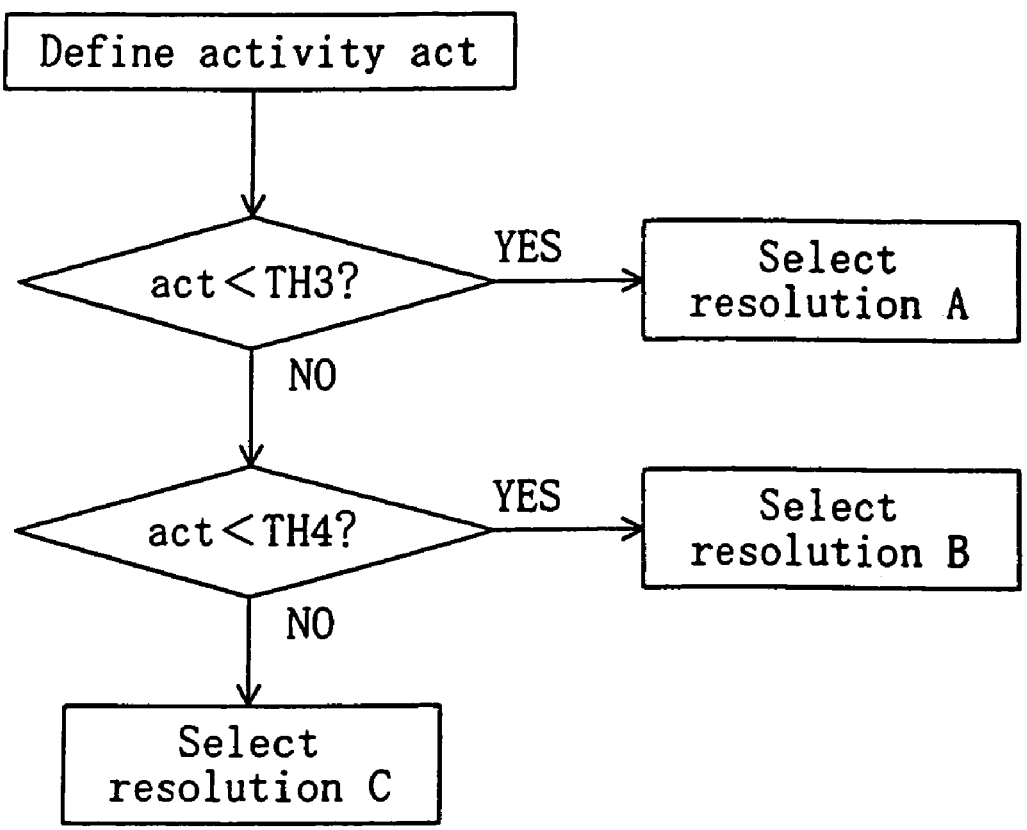
FIG. 11 is a flowchart illustrating how the apparatus shown in FIG. 10 determines the resolution.

FIG. 11 illustrates how to determine the resolution. In the illustrated example, one of the three resolutions A, B and C shown in FIGS. 2B, 2C and 2D, respectively, will be selected as in the first embodiment.

Figure 12:
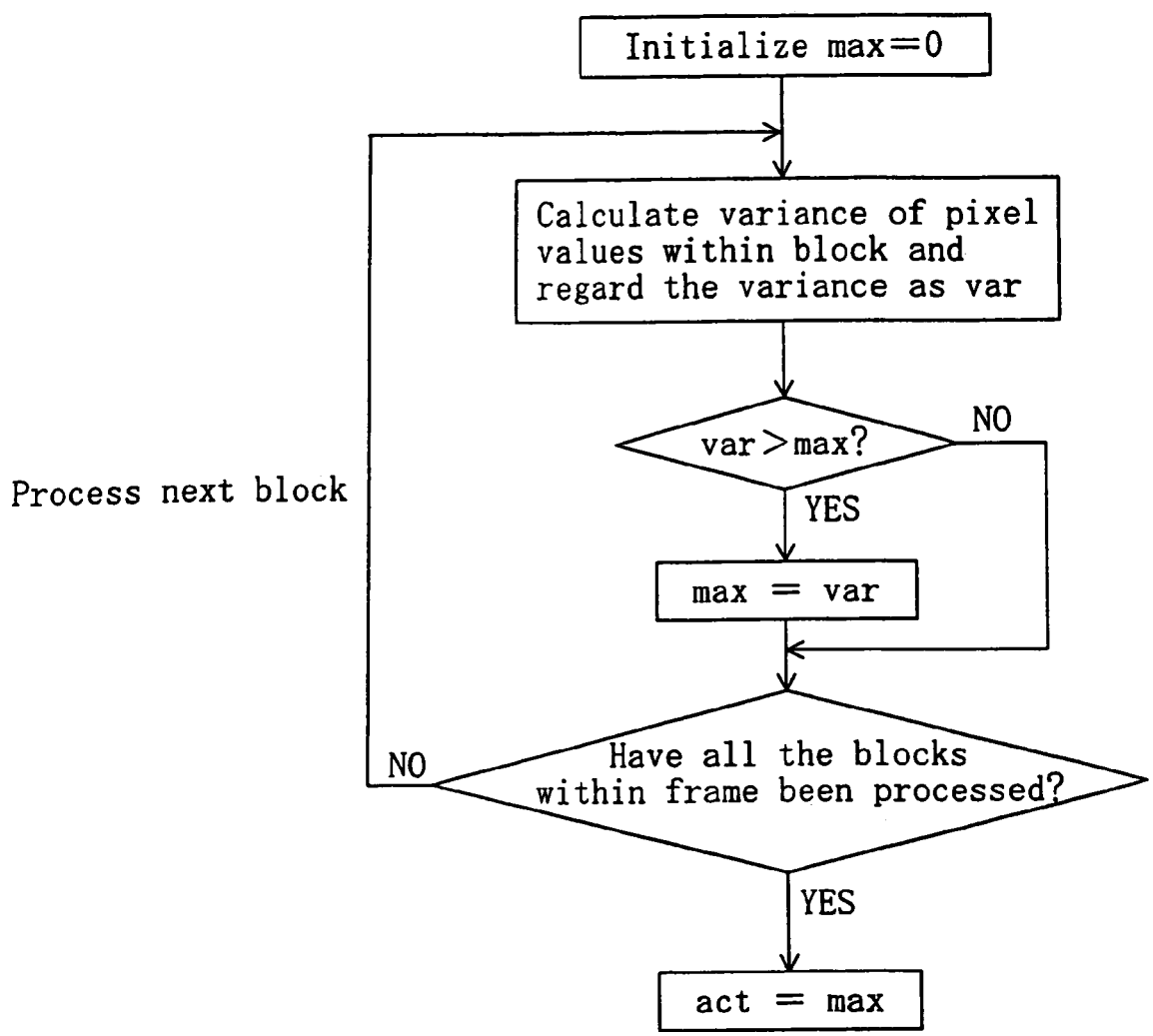
FIG. 12 is a flowchart illustrating detailed sub-steps of the activity defining step shown in FIG. 11.

The resolution determiner 302 determines the resolution using the flowchart illustrated in FIG. 11. First, the determiner 302 defines the activity act. For example, if the activity calculator 301 has calculated the activity as a variance of pixel values within a frame, then act may be represented as the variance. Alternatively, if the calculator 301 has calculated the activity as a variance of pixel values within a macroblock or block, then act may be either the average or the maximum value of the activities within a single frame. FIG. 12 illustrates detailed process steps taken in the latter case. Then, as shown in FIG. 11, the determiner 302 compares the activity act to a predefined threshold value TH3. If act is less than TH3, then the determiner 302 selects the resolution A. Otherwise, the determiner 302 compares act to another predefined threshold value TH4, which is greater than TH3. If act is less than TH4, then the determiner 302 selects the resolution B. Otherwise, the determiner 302 selects the resolution C.

The resolution, selected by the resolution determiner 302, is output to the resolution converter 103. In response, the resolution converter 103 carries out aliasing noise-reduction filtering on the video frame provided via the delay device 100 and then converts its resolution through interpolation or decimation. The video frame, which has been output from the resolution converter 103, is transformed into a coded bit stream by the compression coder 110.

In this manner, the image coding apparatus according to the third embodiment calculates the activity of input video, thereby selecting a resolution most appropriate to the activity value. In this case, the larger the activity, the higher the resolution selected. Thereafter, the input video signal has its resolution converted into the resolution selected and then coded. Thus, the apparatus according to the third embodiment can code input video at a resolution associated with the activity of the input video. That is to say, the number of blocks to be coded can be reduced depending on the activity of the input video. As a result, the number of bits generated can be greatly cut down with the deterioration of image quality suppressed.

In the foregoing embodiment, the two threshold values TH3 and TH4 are defined for the activities and one of the three resolutions A, B and C is selected by reference to these threshold values. Alternatively, any other number of threshold values may be defined for the activities and any arbitrary number of resolutions may be used instead.

Figure 13:
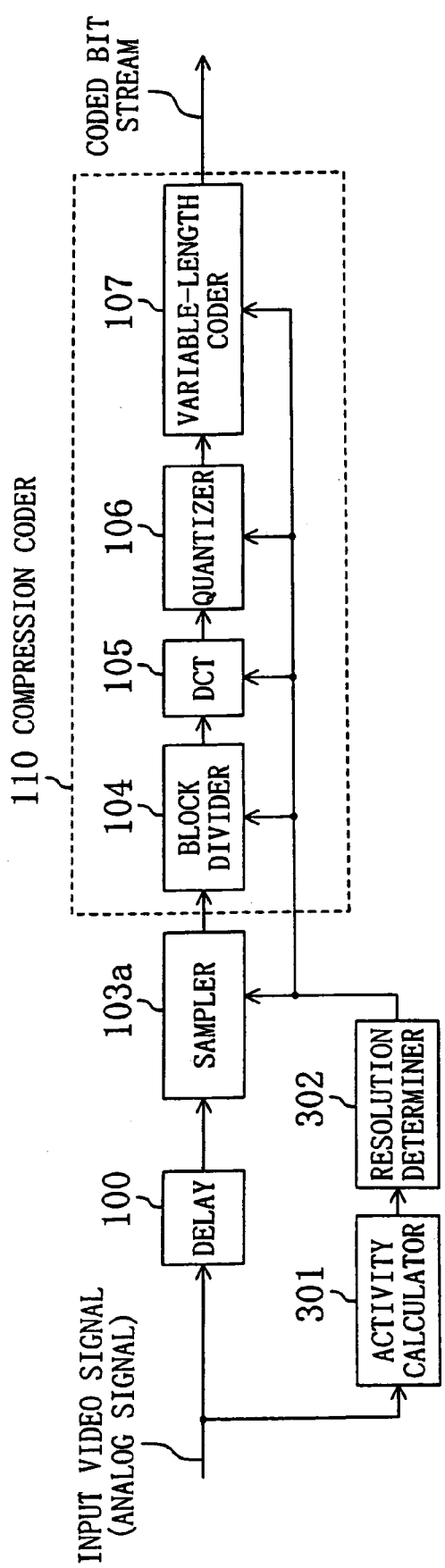
FIG. 13 is a block diagram illustrating a modified example of the apparatus shown in FIG. 10.

FIG. 13 illustrates a modified example of the apparatus shown in FIG. 10. The modified example shown in FIG. 13 is different from the embodiment shown in FIG. 10 in that an analog video signal is input to the apparatus shown in FIG. 13. For that reason, the resolution converter 103 shown in FIG. 10 is replaced with a sampler 103a. In FIG. 13, the resolution, selected by the resolution determiner 302, is output to the sampler 103a. In response, the sampler 103a samples the input video frame, which has been input via the delay device 100, at a sampling frequency corresponding to the resolution selected, and then outputs a digital video signal to the compression coder 110.

Embodiment 4

Figure 14:
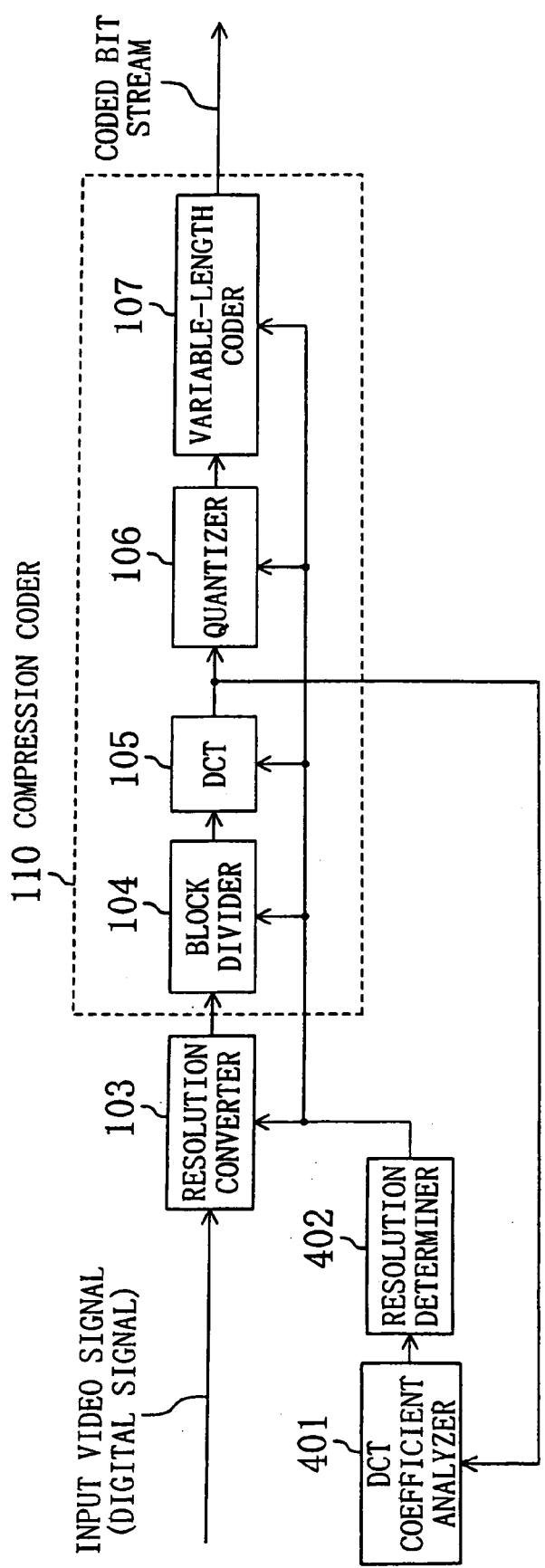
FIG. 14 is a block diagram illustrating an image coding apparatus according to a fourth embodiment of the present invention.

A fourth embodiment of the present invention will be described with reference to FIG. 14. FIG. 14 illustrates an image coding apparatus including DCT coefficient analyzer 401, resolution determiner 402, resolution converter 103 and compression coder 110. The compression coder 110 is made up of the block divider 104, DCT transformer 105, quantizer 106 and variable-length coder 107.

First, a digital video signal is input to the resolution converter 103, which converts the resolution of the video frame into the resolution that has been selected by a method to be described later. The video frame, output from the resolution converter 103, is input to the block divider 104, which divides the frame into multiple blocks. Each block may have a size of 8×8 pixels. Then, these blocks are input to the DCT transformer 105, which performs two-dimensional DCT on each of these blocks, thereby transforming each block into a DCT coefficient block. The DCT coefficient block, output from the DCT transformer 105, is input to the quantizer 106. The quantizer 106 rounds the coefficients by performing quantization thereon. Thereafter, the output of the quantizer 106 is variable-length coded by the variable-length coder 107 and then output as a coded bit stream.

On the other hand, the DCT coefficient block is also output from the DCT transformer 105 to the DCT coefficient analyzer 401. The DCT coefficient analyzer 401 analyzes the input DCT coefficient block for one frame period to see how many high-frequency components are contained in the video frame. This analysis may be carried out in various manners. One example of those techniques will be described with reference to FIG. 15.

Figure 15:
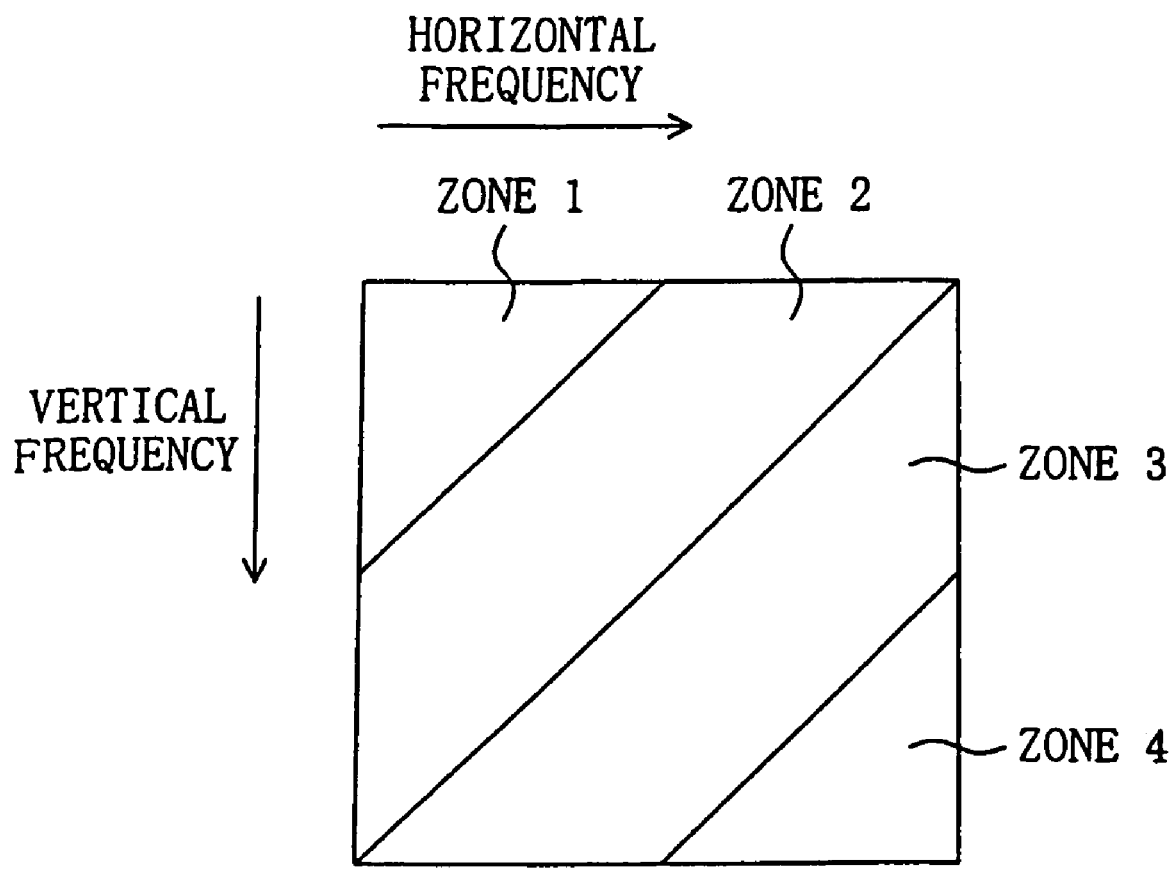
FIG. 15 is a schematic representation of a DCT coefficient block to illustrate the operation of the DCT coefficient analyzer shown in FIG. 14.

FIG. 15 schematically illustrates a DCT coefficient block. As shown in FIG. 15, the DCT coefficient block is divided into Zones 1 through 4 according to the horizontal and vertical frequency components thereof. For one frame period, the DCT coefficient analyzer 401 counts how many highest frequency components belong to which zone for respective DCT coefficient blocks provided from the DCT transformer 105. Then, the analyzer 401 outputs the analysis result to the resolution determiner 402. For example, if the analyzer 401 performs the analysis by the method illustrated in FIG. 15, the analyzer 401 outputs the counts of respective zones. Based on the analysis result provided from the analyzer 401, the resolution determiner 402 determines what resolution to take for the next video frame.

Figure 16:
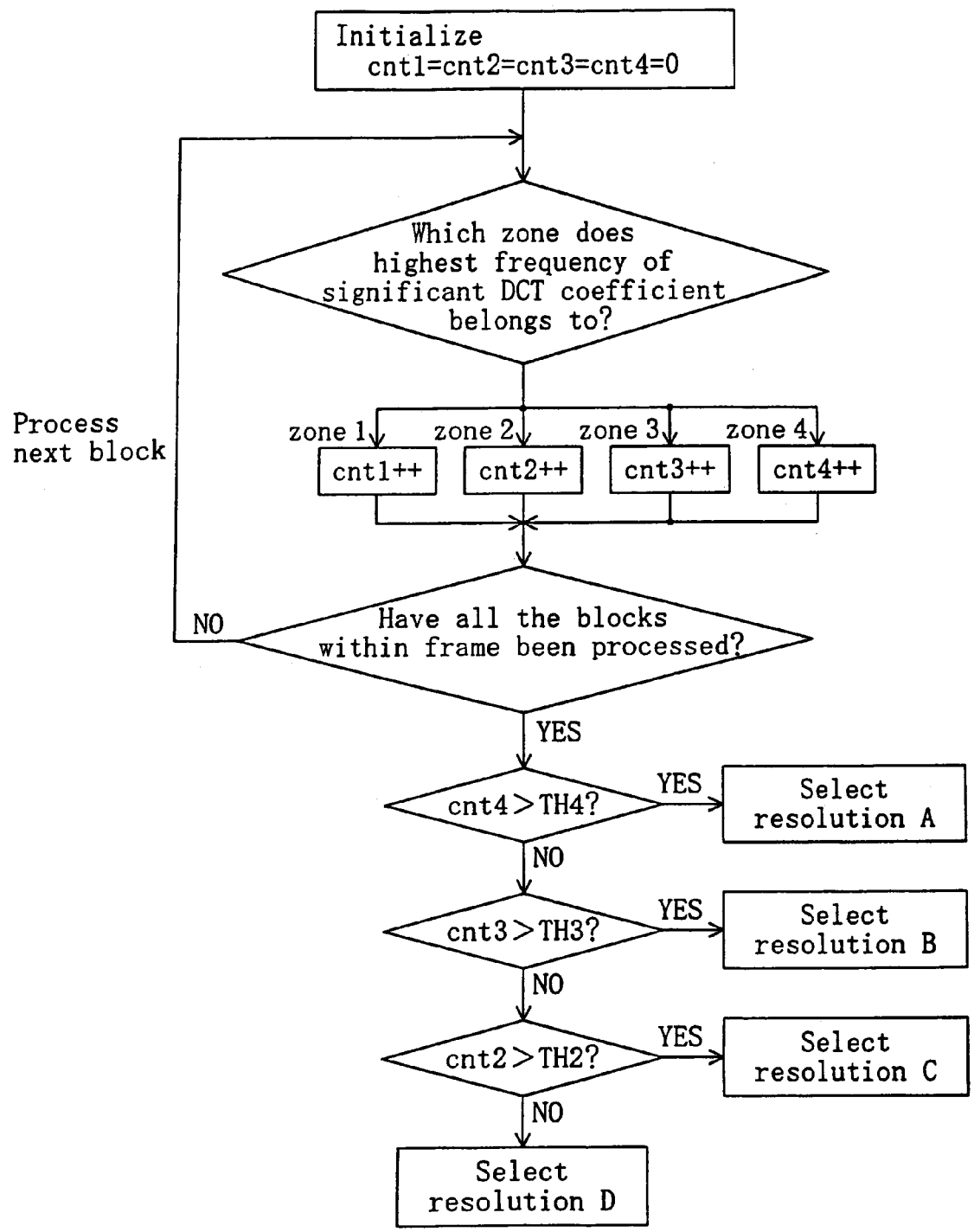
FIG. 16 is a flowchart illustrating how the apparatus shown in FIG. 14 determines the resolution.

Next, it will be described with reference to FIG. 16 how to determine the resolution when the DCT coefficient analyzer 401 performs the analysis by the method shown in FIG. 15. In this case, the counts are sequentially compared to predefined threshold values in the order of Zones 4, 3, 2 and 1 and the resolution is determined depending on which zone has a count exceeding its associated threshold value. The resolutions corresponding to respective zones increase in the ascending order, i.e., in the order of Zones 1, 2, 3 and 4.

The resolution, which has been determined by the resolution determiner 402 in this manner, is output to the resolution converter 103. And the resolution converter 103 converts the current resolution into the resolution selected for the next video frame.

In this manner, the image coding apparatus according to the fourth embodiment analyzes the DCT coefficient block of the input video and determines the resolution by the distribution of high-frequency components in the DCT coefficient block. In this case, the resolution of the input video is determined such that the larger the number of blocks with high-frequency components, the higher the resolution selected. Then, the apparatus converts the resolution of the input video into the resolution selected for the next frame and then codes the video. Thus, the image coding apparatus according to the fourth embodiment can code the input video at a resolution associated with the frequency components of the input video. That is to say, the number of blocks to be coded can be reduced depending on the frequency components of the input video. As a result, the number of bits generated can be greatly cut down with the deterioration of image quality suppressed.

In the foregoing embodiment, the DCT coefficient block is analyzed and divided into four zones. Optionally, the block may be divided into any other number of zones.

Also, in the foregoing embodiment, the DCT coefficient blocks are analyzed for one frame period and the analysis result is used for determining the resolution for the next frame. Alternatively, the DCT coefficient blocks may be analyzed for any other period of a different length.

Figure 17:
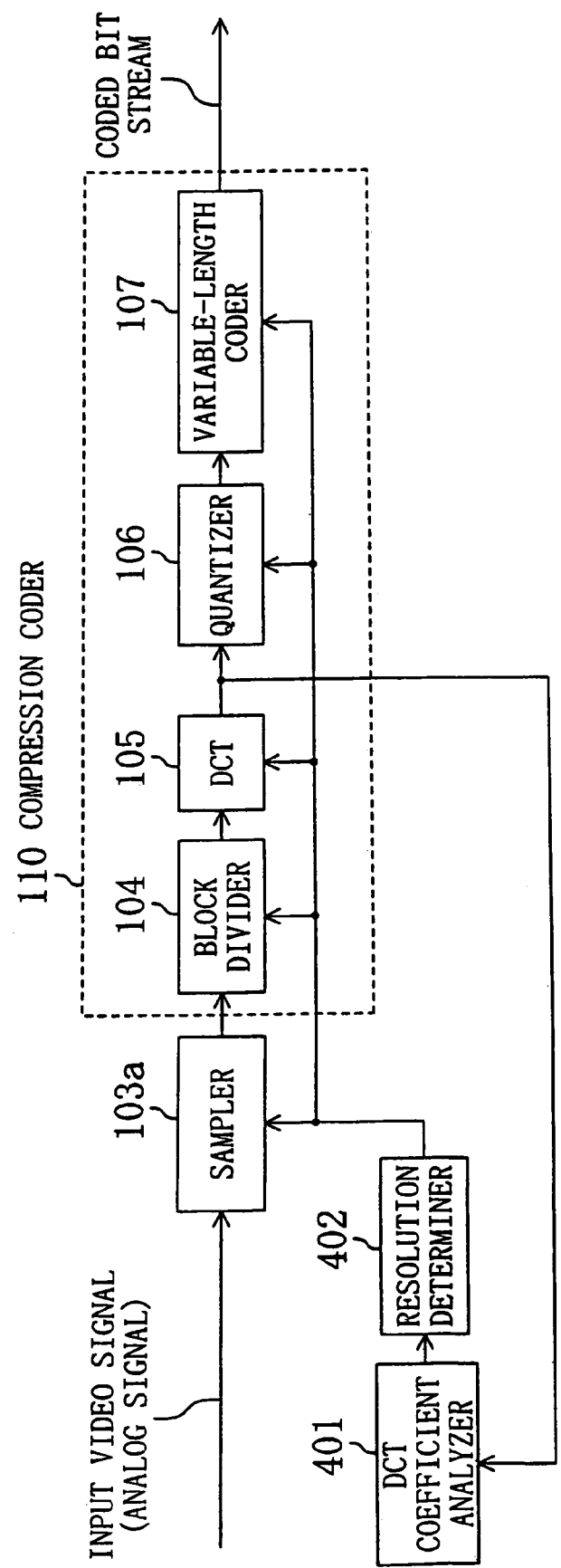
FIG. 17 is a block diagram illustrating a modified example of the apparatus shown in FIG. 14.

FIG. 17 illustrates a modified example of the apparatus shown in FIG. 14. The modified example shown in FIG. 17 is different from the embodiment shown in FIG. 14 in that an analog video signal is input to the apparatus shown in FIG. 17. For that reason, the resolution converter 103 shown in FIG. 14 is replaced with a sampler 103a. In FIG. 17, the resolution, selected by the resolution determiner 402, is output to the sampler 103a. In response, the sampler 103a samples the input video frame at a sampling frequency associated with the resolution selected, and then outputs a digital video signal to the compression coder 110.

Embodiment 5

Figure 18:
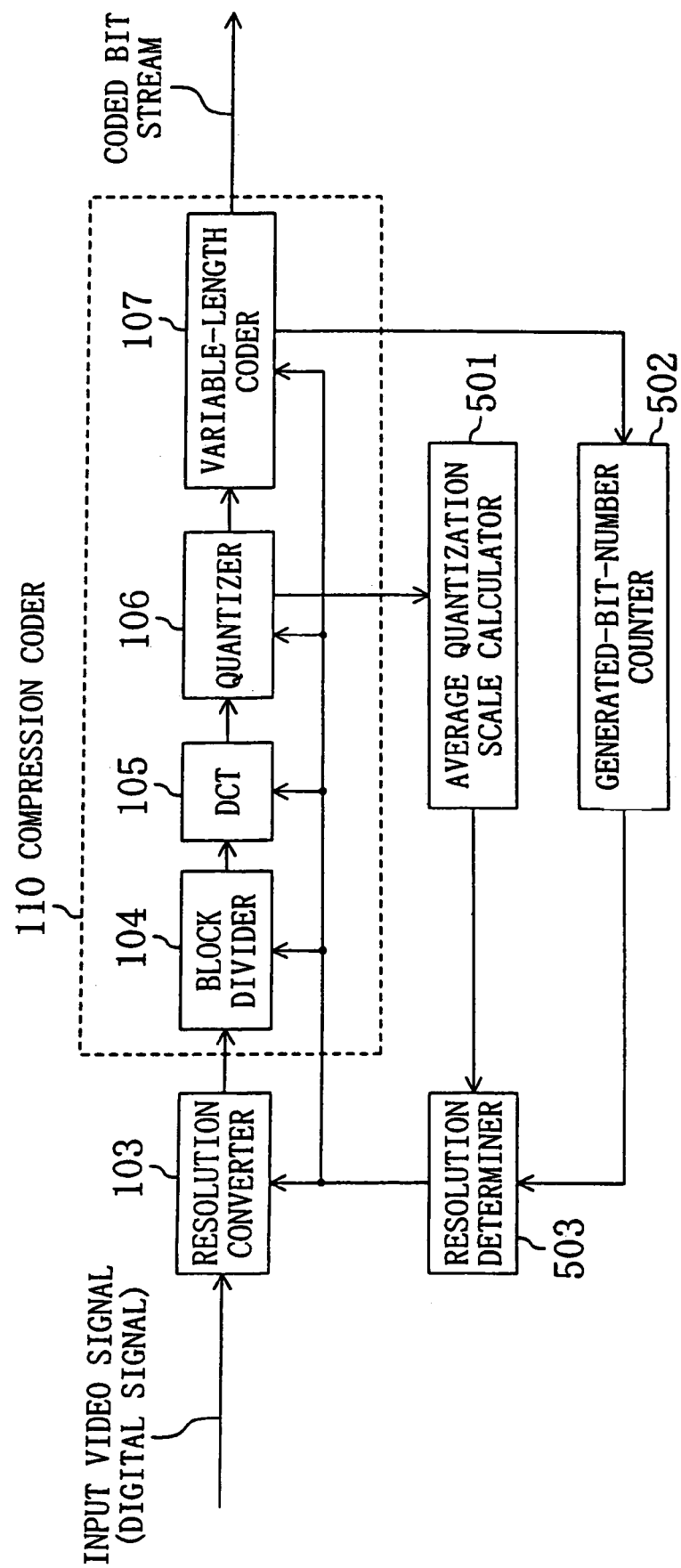
FIG. 18 is a block diagram illustrating an image coding apparatus according to a fifth embodiment of the present invention.

A fifth embodiment of the present invention will be described with reference to FIG. 18. FIG. 18 illustrates an image coding apparatus including average quantization scale calculator 501, generated-bit-number counter 502, resolution determiner 503, resolution converter 103 and compression coder 110. The compression coder 110 is made up of the block divider 104, DCT transformer 105, quantizer 106 and variable-length coder 107.

First, a digital video signal is input to the resolution converter 103, which converts the resolution of the video frame into the resolution that has been selected by a method to be described later. The video frame, output from the resolution converter 103, is input to the block divider 104, which divides the frame into multiple blocks. Then, these blocks are input to the DCT transformer 105, which performs two-dimensional DCT on each of these blocks, thereby transforming each block into a DCT coefficient block. The DCT coefficient block, output from the DCT transformer 105, is input to the quantizer 106. The quantizer 106 rounds the coefficients by performing quantization thereon. Thereafter, the output of the quantizer 106 is variable-length coded by the variable-length coder 107 and then output as a coded bit stream.

On the other hand, the number of bits generated in the coded bit stream, which has been produced by the variable-length coder 107, is input to the generated-bit-number counter 502. The generated-bit-number counter 502 obtains a cumulative sum of numbers of bits generated during a predetermined period (e.g., one frame period) and outputs the cumulative sum to the resolution determiner 503.

Also, the quantization scale, which has been used by the quantizer 106 for the quantization process of the DCT coefficients, is input to the average quantization scale calculator 501. The average quantization scale calculator 501 derives an average of quantization scales for a predetermined period (e.g., one frame period) and outputs the average to the resolution determiner 503.

The resolution determiner 503 multiplies together the cumulative sum of numbers of bits generated during the predetermined period and the average of quantization scales for the predetermined period that have been obtained by the generated-bit-number counter 502 and the average quantization scale calculator 501, respectively. In the following description, this product will be called a "complexity X". The complexity X is a value representing how difficult to code video is. That is to say, the larger the complexity, the more difficult it is to code the video. In other words, supposing video is coded at the same quantization scale, the larger complexity, the greater the number of bits generated.

Figure 19:
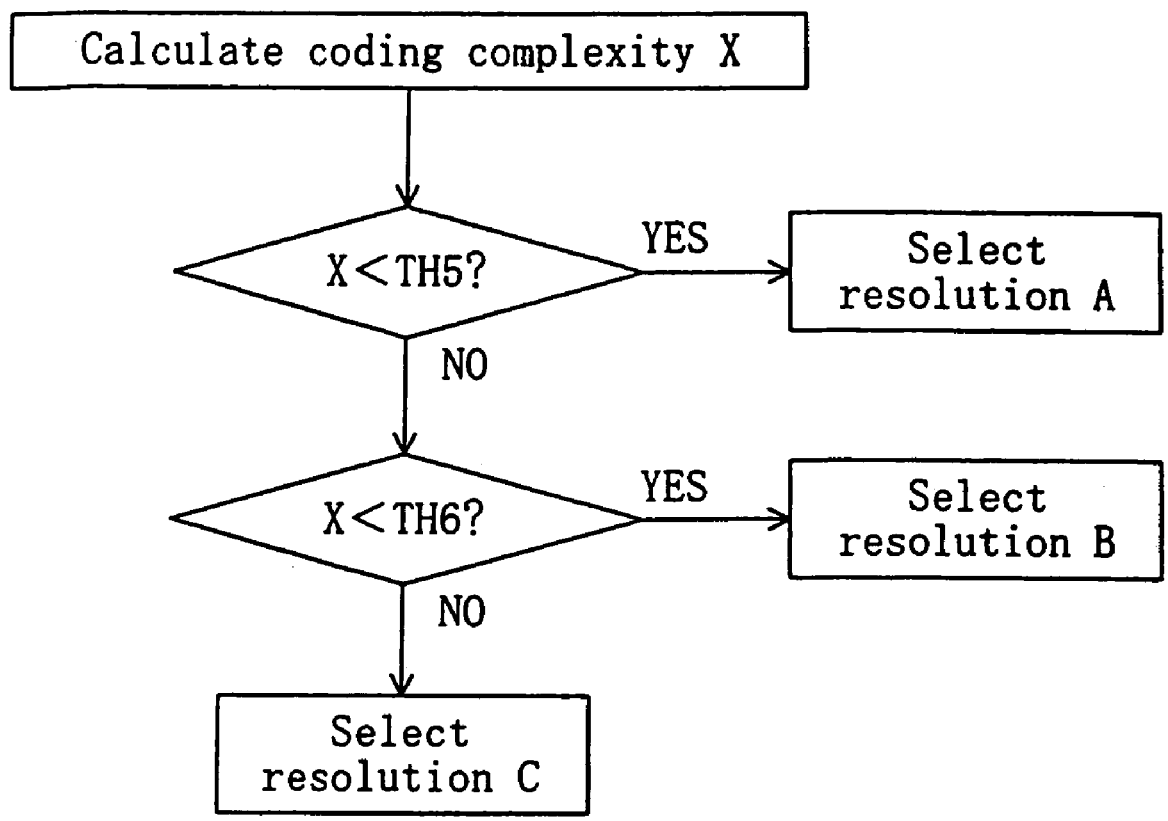
FIG. 19 is a flowchart illustrating how the apparatus shown in FIG. 18 determines the resolution.

The resolution determiner 503 determines the resolution using the flowchart illustrated in FIG. 19. In the illustrated example, one of the three resolutions A, B and C shown in FIGS. 2B, 2C and 2D, respectively, will be selected. First, the determiner 503 obtains the complexity X for a predetermined period. Then, the determiner 503 compares the complexity X to a predefined threshold value TH5. If X is less than TH5, then the determiner 503 selects the resolution A. Otherwise, the determiner 503 compares X to another predefined threshold value TH6, which is greater than TH5. If X is less than TH6, then the determiner 503 selects the resolution B. Otherwise, the determiner 503 selects the resolution C.

The resolution, selected by the resolution determiner 503 in this manner, is output to the resolution converter 103. In response, the resolution converter 103 converts the current resolution into the resolution selected for the next video frame.

In this manner, the image coding apparatus according to the fifth embodiment calculates a complexity based on the numbers of bits generated and quantization scales for a past predetermined period, thereby selecting a most appropriate resolution depending on the magnitude of the complexity. In this case, the larger the complexity (i.e., the more difficult it is to code input video), the higher the resolution selected. Thereafter, the input video has its resolution converted into the resolution selected for the next frame and then coded. Thus, the apparatus according to the fifth embodiment can code input video at a resolution associated with the coding complexity of the input video. That is to say, the number of blocks to be coded can be reduced depending on the coding complexity of the input video. As a result, the number of bits generated can be greatly cut down with the deterioration of image quality suppressed.

In the foregoing embodiment, the cumulative sum of the numbers of bits generated and the average of quantization scales are obtained for one frame period. Alternatively, these values may be obtained for any other period.

Also, in the foregoing embodiment, the two threshold values TH5 and TH6 are defined for the complexities and one of the three resolutions A, B and C is selected by reference to these threshold values. Alternatively, any other number of threshold values may be defined for the complexities and any arbitrary number of resolutions may be used instead.

Figure 20:
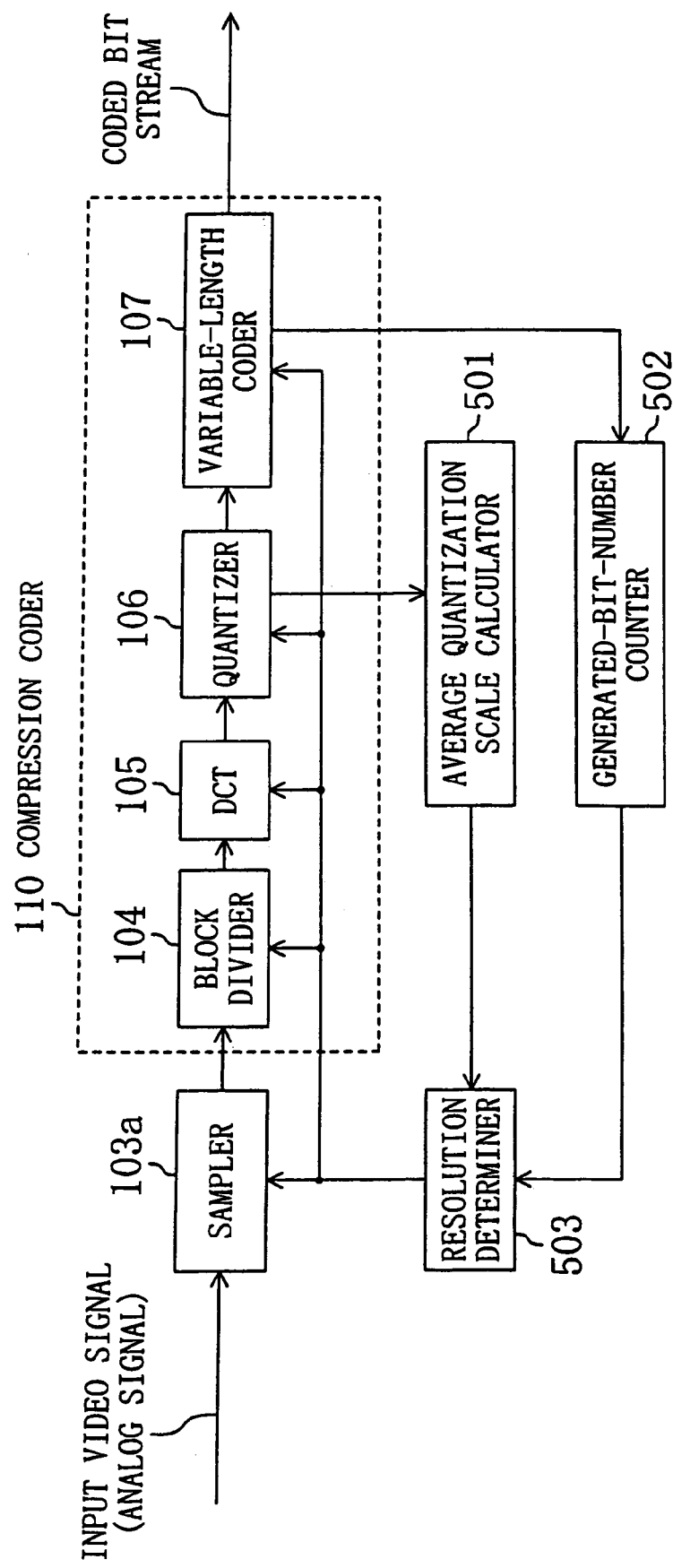
FIG. 20 is a block diagram illustrating a modified example of the apparatus shown in FIG. 18.

FIG. 20 illustrates a modified example of the apparatus shown in FIG. 18. The modified example shown in FIG. 20 is different from the embodiment shown in FIG. 18 in that an analog video signal is input to the apparatus shown in FIG. 20. For that reason, the resolution converter 103 shown in FIG. 18 is replaced with a sampler 103a. In FIG. 20, the resolution, selected by the resolution determiner 503, is output to the sampler 103a. In response, the sampler 103a samples the input video frame at a sampling frequency corresponding to the resolution selected, and then outputs a digital video signal to the compression coder 110.

The first through fifth embodiments of the present invention have been described as being applied to intra-frame coding. However, the resolution conversion may be carried out in a similar manner even when the present invention is applied to inter-frame coding.

Also, in the foregoing embodiments, the resolution is reduced horizontally. Alternatively, the resolution may be reduced either vertically or both horizontally and vertically alike.

Moreover, the present invention is supposed to adopt the MPEG-2 video compression technique in the foregoing embodiments. However, any other video compression method may be used instead.

Hereinafter, sixth through ninth embodiments of the present invention will be described. The following embodiments are particularly suitably applicable to storing an audiovisual (AV) stream, obtained by compressing and coding video and audio signals, on a storage medium like a hard disk drive or a rewritable optical disk such as DVD-RAM.

Embodiment 6

Figure 21:
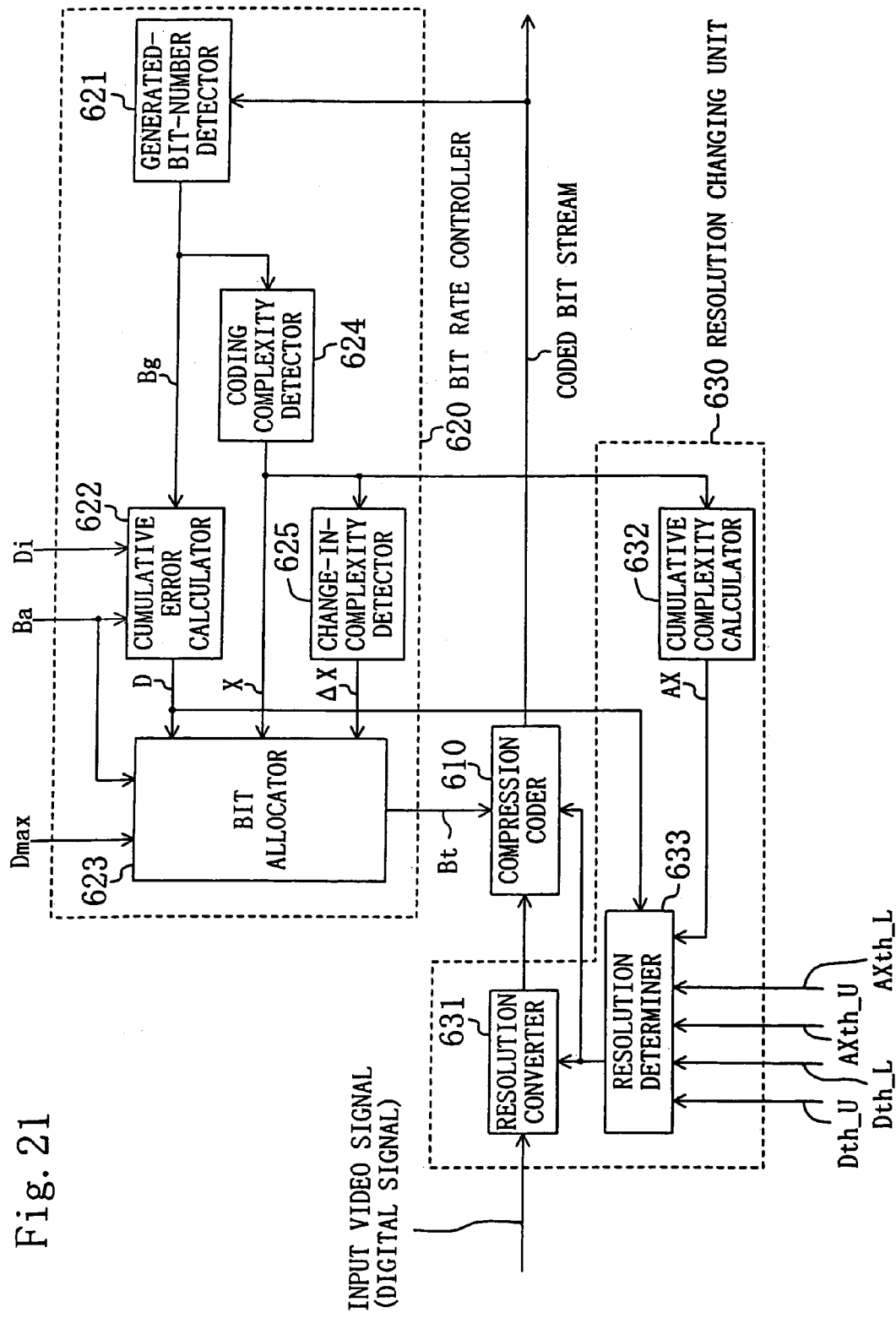
FIG. 21 is a block diagram illustrating an image coding apparatus according to a sixth embodiment of the present invention.

A sixth embodiment of the present invention will be described with reference to FIG. 21. FIG. 21 illustrates an image coding apparatus including compression coder 610, bit rate controller 620 and resolution changing unit 630.

The compression coder 610 is made up of the block divider, DCT transformer, quantizer and variable-length coder (none of which is shown in FIG. 21). The compression coder 610 compresses a video signal and outputs a coded bit stream with a variable bit rate corresponding to a variable number Bt of bits allocated. The allocated bit number Bt defines a quantization scale for the compression coder 610.

The bit rate controller 620 controls the number of binary bits generated per unit time. The bit rate controller 620 includes generated-bit-number detector 621, cumulative error calculator 622, bit allocator 623, coding complexity detector 624 and change-in-complexity detector 625. The generated-bit-number detector 621 detects the number Bg of bits generated per unit period of the coded bit stream. The cumulative error calculator 622 calculates a cumulative error D by sequentially adding up errors, each representing a difference between the generated bit number Bg detected and a given average target number Ba. The bit allocator 623 controls the number Bt of bits allocated to the compression coder 610. The coding complexity detector 624 detects a coding complexity X, which indicates how difficult to code a scene represented by the video signal is, based on the generated bit number Bg. And the change-in-complexity detector 625 detects a change of scenes by a variation in coding complexity X. The coding complexity X is calculated based on the generated bit number Bg and the quantization scale. When scenes are changed, a change-in-complexity detection signal $\Delta X$ is supplied to the bit allocator 623. The initial and maximum values of the cumulative error are identified by Di and Dmax, respectively. In the illustrated embodiment, a difference between the cumulative error D and the maximum value Dmax thereof is defined as a margin M. The cumulative error D and the coding complexity X may be calculated every time one GOP (group of pictures) period has passed.

The resolution changing unit 630 includes resolution converter 631, cumulative complexity calculator 632 and resolution determiner 633. The resolution converter 631 changes the resolution of the input digital video signal and provides the signal with the newly defined resolution to the compression coder 610. The cumulative complexity calculator 632 calculates a cumulative complexity AX by accumulating the coding complexities X for 30 to 40 GOP periods. And the resolution determiner 633 determines the resolution by at least one of the magnitudes of the cumulative error D and the cumulative complexity AX. The resolution converter 631 may operate in either a high- or low-resolution mode. In the high-resolution mode, if the original resolution of the input video signal is represented as 704 horizontal pixels by 480 vertical pixels, for example, then the converter 631 may output the video signal as it is without reducing the resolution from 704×480. In the low-resolution mode on the other hand, the converter 631 may output the video signal with a resolution of 352×480 after halving the horizontal resolution thereof. If the cumulative error D goes on increasing to exceed a predefined threshold value Dth_U, then the resolution changing unit 630 outputs the video signal in the low-resolution mode (e.g., at the resolution of 352×480). And when the cumulative error D subsequently decreases to less than another threshold value Dth_L, which is smaller than Dth_U, then the resolution changing unit 630 restores the resolution of the video signal to the original one (e.g., 704×480). Also, if the cumulative complexity AX goes on increasing to exceed a predefined threshold value Axth_U, then the resolution changing unit 630 outputs the video signal in the low-resolution mode (e.g., at the resolution of 352×480). And when the cumulative complexity AX subsequently decreases to less than another threshold value AXth_L, which is smaller than AXth_U, then the resolution changing unit 630 restores the resolution of the video signal to the original one (e.g., 704×480).

The bit allocator 623 performs feedback control by newly determining the allocated bit number Bt based on the coding complexity X just after the change of scenes and by sequentially updating the previously allocated bit number Bt within the same scene. Specifically, as for a frame just after the scene change, the bit allocator 623 determines the allocated bit number Bt by presetting a provisionally allocated bit number such that a number of bits, which are allocated to a relatively complex scene with a coding complexity X exceeding an average complexity Xa, is greater than the average target number Ba. And if the cumulative error D exceeds a predetermined value at this point in time, the bit allocator 623 corrects the provisionally allocated bit number according to the magnitude of the cumulative error D such that the provisionally allocated bit number is reducible to, but not less than, the average target number Ba. However, a number Bt of bits, which are allocated to a monotonous scene with a coding complexity X lower than the average complexity Xa, is less than the average target number Ba. As for frames within the same scene on the other hand, the bit allocator 623 sequentially updates a previously allocated bit number Bt such that the cumulative error D does not exceed the predetermined maximum value Dmax. In this case, the bit allocator 623 determines the updated allocated bit number Bt such that as the cumulative error D approximates the maximum value Dmax, the allocated bit number Bt approximates the average target number Ba.

Figure 22A:
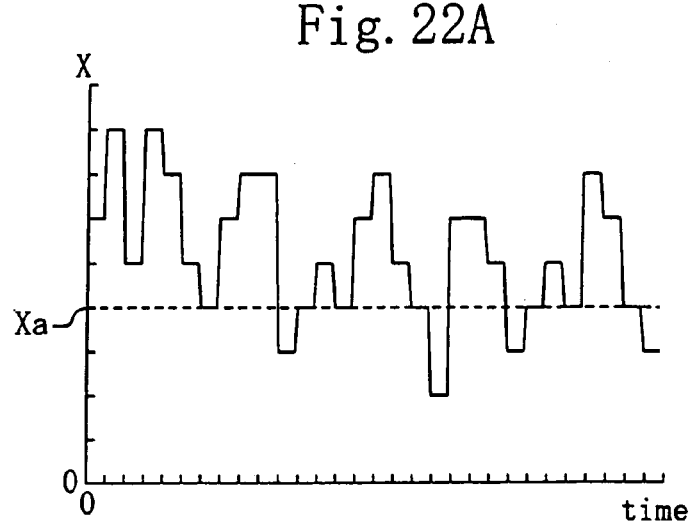
FIGS. 22A through 22C are graphs illustrating how the apparatus shown in FIG. 21 may operate unless the resolution is changed.
Figure 22B:
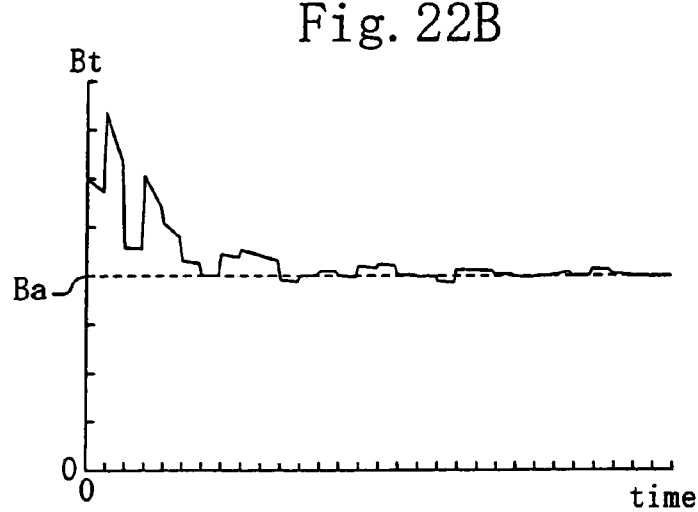
Figure 22C:
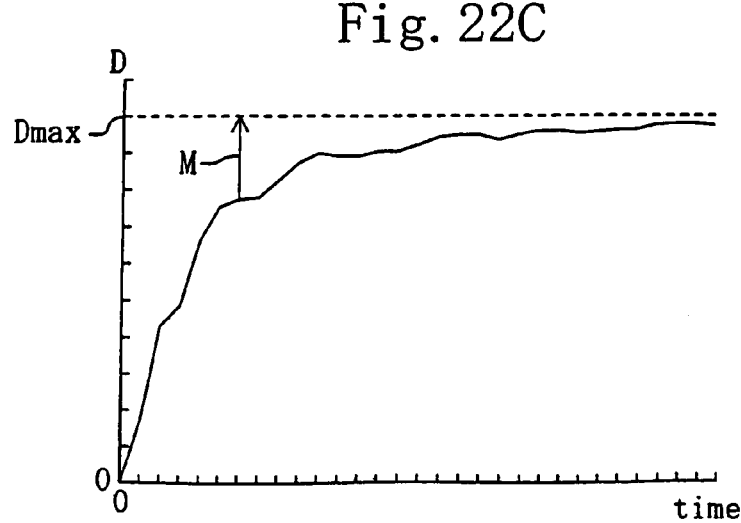

FIGS. 22A through 22C illustrate how the image coding apparatus shown in FIG. 21 may operate unless the resolution is changed. In the example shown in FIGS. 22A through 22C, a series of scenes with relatively high coding complexities have appeared successively. FIGS. 22A, 22B and 22C illustrate respective variations of coding complexity X, allocated bit number Bt and cumulative error D with time. In the illustrated embodiment, the initial value Di of the cumulative error is supposed to be zero. In other words, the margin M is set equal to Dmax in the initial state.

As shown in FIGS. 22B and 22C, the allocated bit number Bt gradually decreases as there is smaller and smaller margin M left. Before long, the cumulative error D reaches its maximum value Dmax, i.e., no margin M is left. Once the margin M is exhausted, only the average target number Ba of bits are allocable to even a scene with a high coding complexity X. That is to say, the total number of bits generated never exceeds a predetermined value. Thus, it is possible to ensure that recording can be finished within a limited capacity available. In addition, even after there is no margin M left, image quality, comparable to that attained by fixed-bit-rate control, is still attainable.

However, since the mode of control is virtually no different from the fixed-bit-rate control once the margin M has been exhausted, the control cannot be carried out at a variable bit rate in accordance with the coding complexity of each scene represented by the input video signal. Thus, if a video signal with a relatively high coding complexity has been input in such a state, then a sufficiently large number of bits cannot be allocated to such a scene. As a result, various types of coding noise unique to DCT coding, e.g., block noise and mosquito noise, is generated to considerably deteriorate the resultant image quality.

To solve this problem, the resolution of the input video signal is intentionally decreased according to this embodiment in such a situation where it is difficult to continue the variable-bit-rate control with just a little margin M left. By making the number of generated bits change more slowly in this manner, the variable-bit-rate control can be continued.

For example, if the cumulative error D goes on increasing to reach the vicinity of the maximum cumulative error Dmax, i.e., if the margin M left (=Dmax−D) is approaching zero, then the resolution of the input video signal is reduced to decrease the coding complexity X. In this manner, the number Bg of bits generated can be lower compared to the situation where coding is carried out at the original resolution. And it is possible to prevent the margin M from further decreasing. Also, since the margin M is not completely exhausted and the variable-bit-rate control can be continuously carried out in accordance with the coding complexity of the input video signal, block noise or mosquito noise, unique to DCT coding, can be minimized effectively.

Figure 23A:
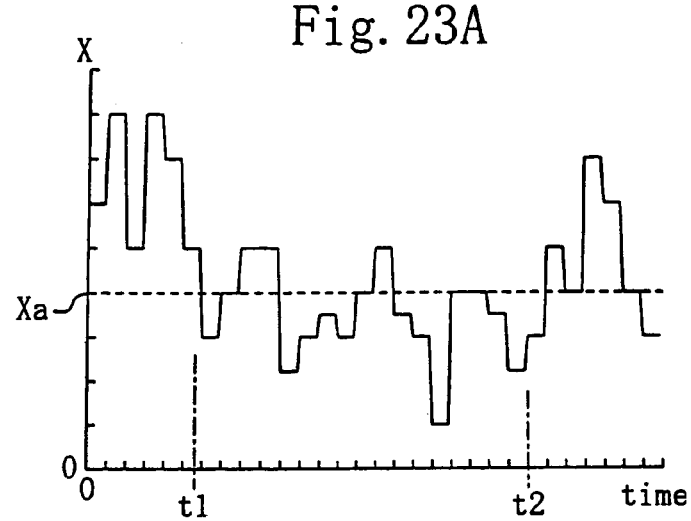
FIGS. 23A through 23C are graphs illustrating how the apparatus shown in FIG. 21 may operate if the resolution is changed.
Figure 23B:
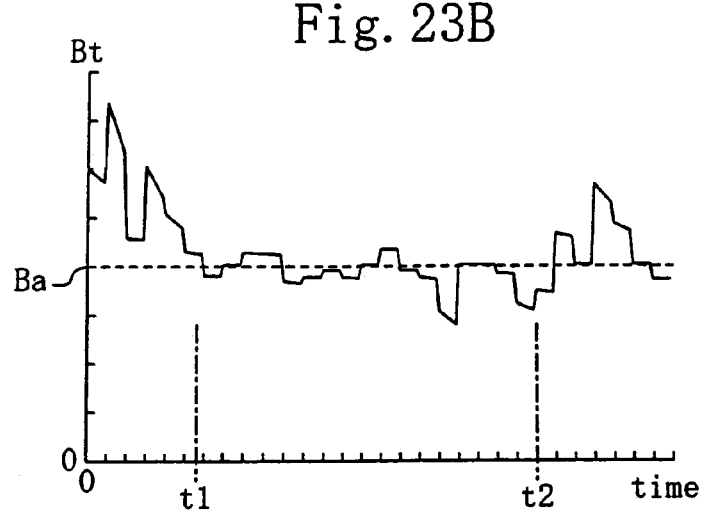
Figure 23C:
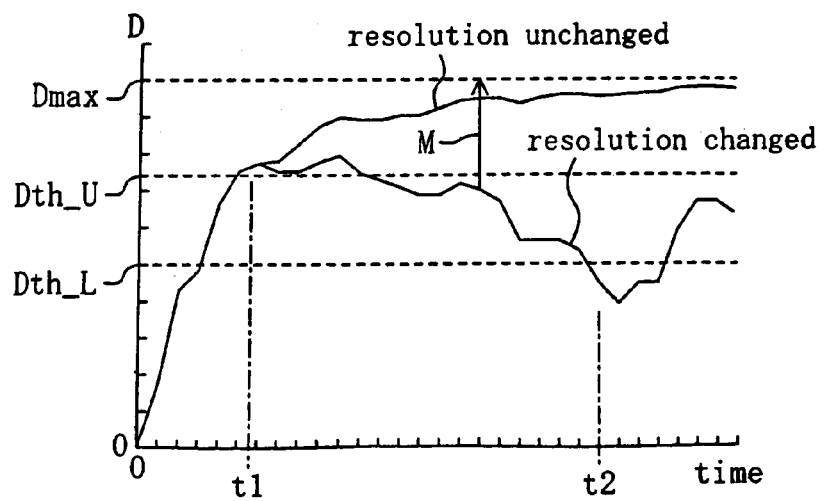

FIGS. 23A through 23C illustrate how effective it is for the image coding apparatus shown in FIG. 21 to change the resolution according to the cumulative error D, where Dth_U=Dmax×¾ and Dth_L=Dmax/2. The same input video signal as that modeled in FIG. 22A is also used in this example. In this case, however, in the period between times t1 and t2 during which coding is performed with a reduced resolution, the coding complexity X, which is detected from the number Bg of bits generated, can be lowered to about 70% of that resulting from the original resolution.

As shown in FIGS. 23A and 23C, the input video signal represents a series of scenes with relatively high coding complexities X and the cumulative error D increases monotonically in the period between times 0 and t1. And then the cumulative error D exceeds the threshold value Dth_U around the time t1. Thus, at this time t1, the resolution changing unit 630 changes the resolution of the input video signal from the original one of 704×480 into a lower resolution of 352×480.

In the low-resolution mode, the coding complexities X of the input video signal decrease compared to the high-resolution mode and change as shown in FIG. 23A. In the meantime, the cumulative error D is either almost unchanged or decreasing to less than the threshold value Dth_L around the time t2. Then, the resolution changing unit 630 restores the resolution of the input video signal from the lower one of 352×480 into the original one of 704×480.

FIG. 23C also illustrates how the cumulative error D changes unless the resolution is changed. As shown in FIG. 23C, the cumulative error D at the time t2 has a much larger margin M compared to that illustrated in FIG. 22C. It can also be seen from FIG. 23B that an optimum number Bt of bits will be allocable from the time t2 on in accordance with the coding complexity X of the input video signal.

Figure 24A:
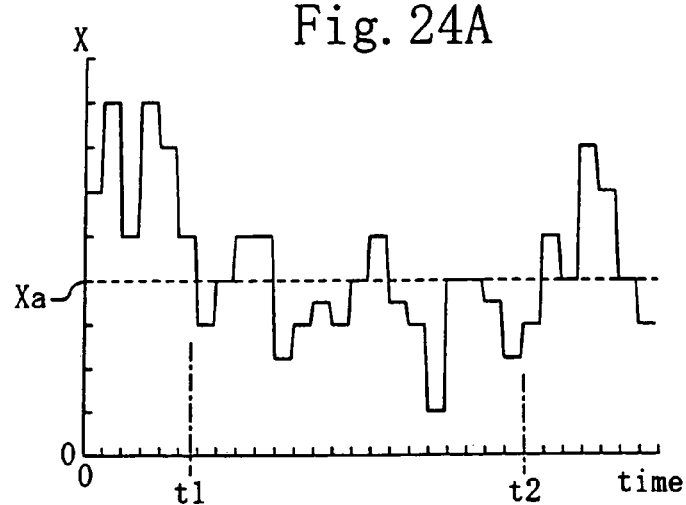
FIGS. 24A through 24C are graphs illustrating how the apparatus shown in FIG. 21 may operate if the resolution is changed.
Figure 24B:
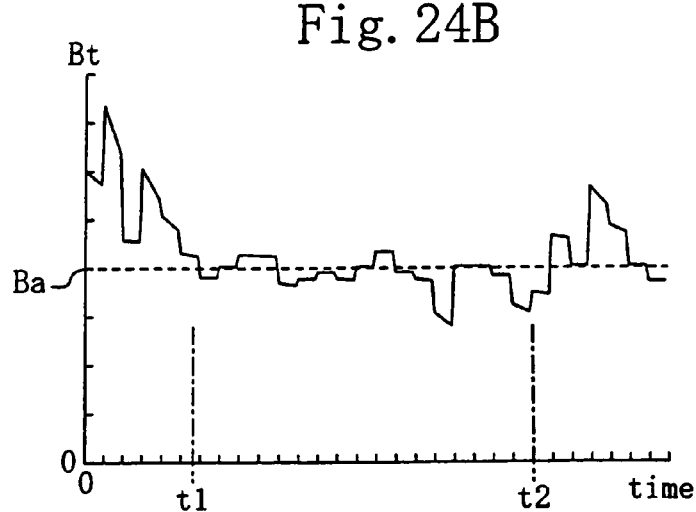
Figure 24C:
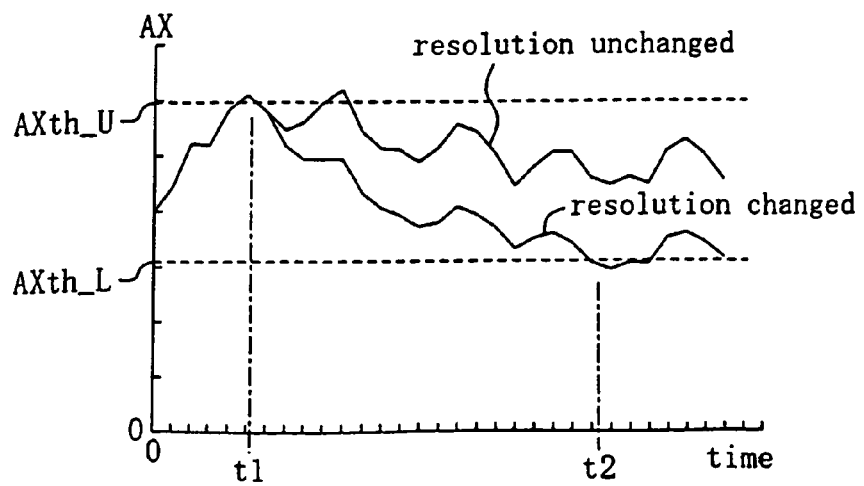

FIGS. 24A through 24C illustrate how effective it is for the image coding apparatus shown in FIG. 21 to change the resolution according to the cumulative complexity AX. As can be seen from FIGS. 24A through 24C, similar effects are attainable as in the case of changing the resolution according to the cumulative error D.

In this manner, the apparatus of the sixth embodiment adaptively changes the resolution of the input video signal according to the magnitude of the cumulative error D or cumulative complexity AX, thereby continuously performing the variable-bit-rate control based on the coding complexity of the input video signal. Thus, the apparatus can suppress the coding noise effectively. In addition, since hysteresis characteristics are realized by setting two threshold values at which the resolution is lowered and restored, respectively, the resolution is not changed too frequently. Furthermore, decrease in resolution is not so recognizable to the human eyes as for a scene with a lot of motion. Accordingly, adverse effects caused by the decrease in resolution can be minimized for such a scene.

In the foregoing embodiment, the resolution converter 631 uses two resolutions and changes the resolution from the original one into the lower or vice versa. Alternatively, the converter 631 may select one of three or more resolutions. The resolution may also be changed taking the magnitudes of the cumulative error D and the cumulative complexity X into account in an appropriate combination. For example, reduction of the resolution to the lower one may be determined by the magnitude of the cumulative error D and restoration of the resolution to the higher one may be determined by the magnitude of the cumulative complexity AX. Also, these two conditions may be combined selectively. That is to say, the resolution may be changed when one or both of these conditions are met. Furthermore, the resolution converter 631 may be replaced with a sampler receiving an analog input signal.

Embodiment 7

A seventh embodiment of the present invention will be described with reference to FIG. 25. This embodiment provides an image coding apparatus including means for changing a resolution such that a resolution change point is less recognizable to the human eyes. As shown in FIG. 25, the apparatus further includes a still scene detector 640 and a scene change detector 641.

The still scene detector 640 detects a still scene from an input video signal. On detecting a still scene the detector 640 informs the resolution changing unit 630 of that detection. The scene change detector 641 detects a scene change, i.e., a point where the scenes represented by the input video signal are changed. On detecting a scene change, the detector 641 informs the resolution changing unit 630 of that detection. The still scene or scene change may be detected by any of various methods, e.g., according to a difference in pixel value between frames or a variation of some feature quantity such as luminance or chroma level.

The resolution changing unit 630 does not change the resolution the instant the unit 630 receives information from the bit rate controller 620 that the resolution should be changed. Instead, the unit 630 waits for the still scene or scene change information to be provided from the still scene or scene change detector 640 or 641 and changes the resolution as soon as the unit 630 is provided with that information.

In this manner, the image coding apparatus according to the seventh embodiment postpones required resolution change until the apparatus has detected a still scene or scene change. Thus, the resolution change is less recognizable to the human eyes.

In the foregoing embodiment, both the still scene and scene change are used. However, it is naturally possible to use at least one of them.

Embodiment 8

Figure 26:
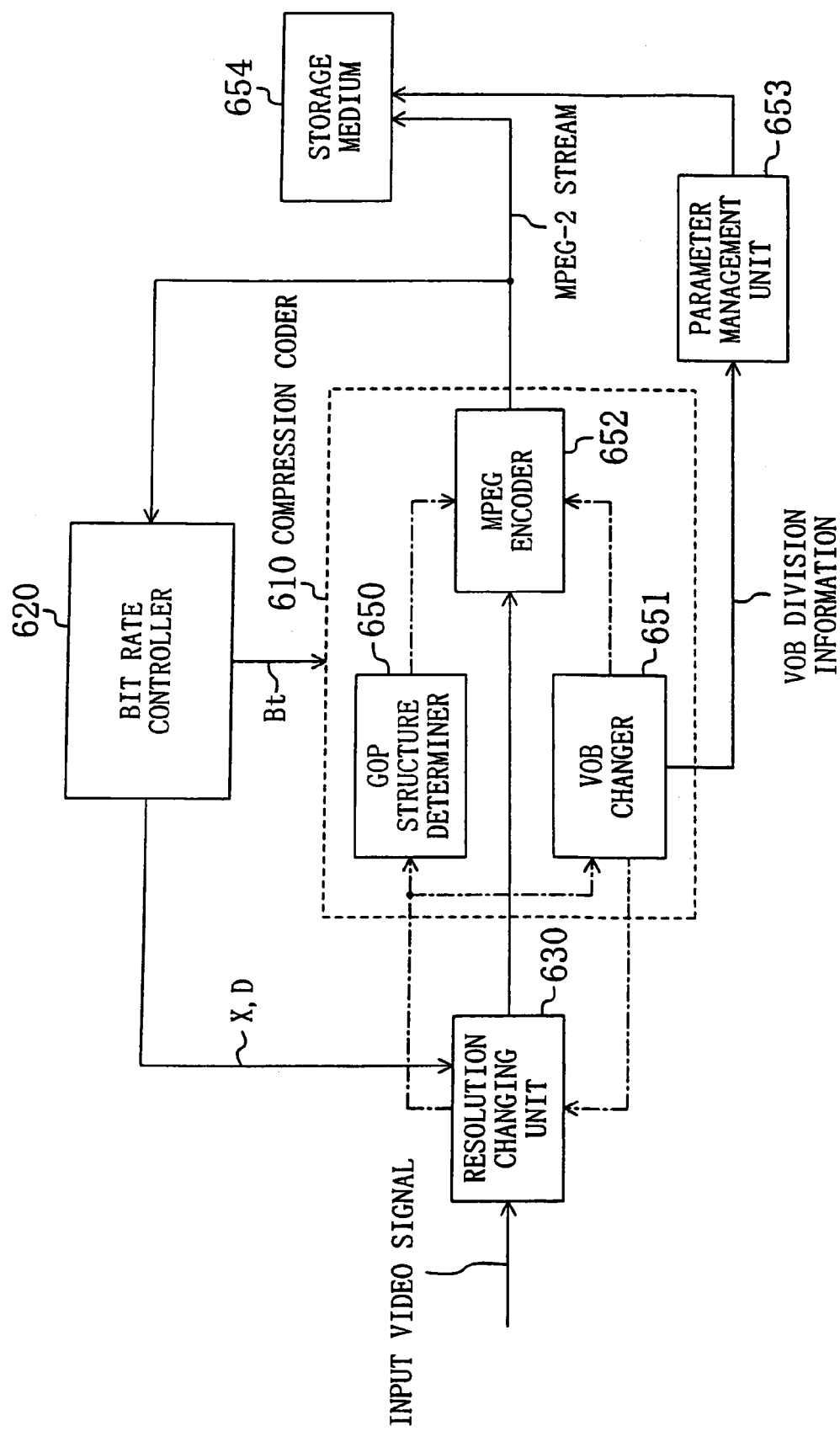
FIG. 26 is a block diagram illustrating an image coding apparatus according to an eighth embodiment of the present invention.

An eighth embodiment of the present invention will be described with reference to FIG. 26. In the apparatus of this embodiment, when an AV stream produced is written, along with its management information, on a storage medium 654 like a DVD-RAM, the AV stream can be easily synchronized with the management information and the size of the management information does not become too large. FIG. 26 illustrates an image coding apparatus including compression coder 610, bit rate controller 620, resolution changing unit 630 and parameter management unit 653. The compression coder 610 is made up of GOP structure determiner 650, VOB changer 651 and MPEG encoder 652.

According to the MPEG-2 standard, coded bit streams of video signals with mutually different resolutions must be regarded as distinct ones and should not be regarded as belonging to the same sequence. That is to say, before and after the resolution is changed, two coded bit streams should be produced as separate sequences.

Dividing GOP and Sequence

Figures 27A, 27B, 27C:
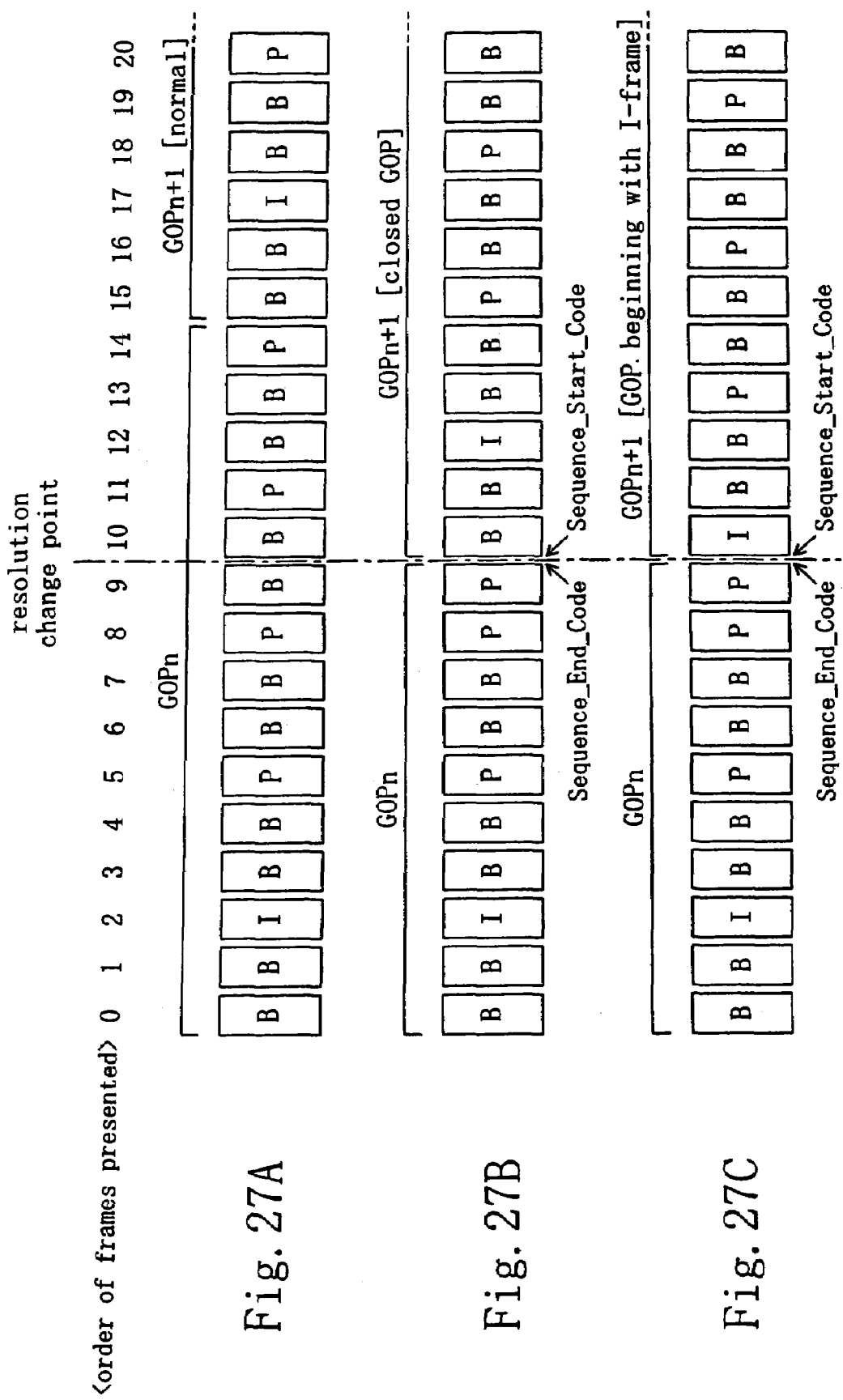
FIGS. 27A through 27C illustrate examples of GOP structures defined by the GOP structure determiner shown in FIG. 26.

In FIG. 26, the GOP structure determiner 650 determines the GOP structure for use in MPEG encoding by the MPEG encoder 652. Also, when the resolution changing unit 630 changes the resolution, the determiner 650 divides a GOP into two, thereby starting a new GOP. FIGS. 27A through 27C illustrate these operations. Specifically, FIG. 27A illustrates a normal GOP structure, in which M=3 and N=15. In this case, an I- or P-frame appears every $M^{th}$ frame and N is the number of frames included in one. GOP. On the other hand, FIGS. 27B and 27C illustrate how the GOP structure is changed when the resolution is changed before Frame 10, where the number attached to each frame represents its presentation order.

In FIG. 27B, a GOP, newly starting after the resolution has been changed, is a closed GOP, which does not refer to the previous GOP. More specifically, the two frames (Frames 10 and 11), preceding the first I-frame (Frame 12) of the GOP newly starting at the resolution change point according to the presentation order, are predictively coded without referring to the P-frame (Frame 9) belonging to the previous GOP. Accordingly, there is no correlation between the GOPs before and after the resolution is changed.

In FIG. 27C, a GOP newly starting after the resolution has been changed begins with an I-frame according to the presentation order. Thus, the newly starting GOP has no correlation with the previous GOP, either.

In an MPEG-2 stream produced by the image coding apparatus including the GOP structure determiner 650, a GOP can be divided into two at a resolution change point. In addition, there is no correlation between GOPs before and after the resolution change point. Thus, Sequence_End_Code and Sequence_Start_Code can be inserted to the end of the GOP located just before the resolution change point and to the beginning of the newly starting GOP, respectively. That is to say, the bit stream can be easily divided into two independent coded stream sequences at the resolution change point. The Sequence_Start_Codes may be inserted to the respective beginnings of all the GOPs.

Dividing VOB

In storing an AV stream, which is obtained by multiplexing a series of coded video and audio bit streams together, on a storage medium such as a DVD-RAM, a video object (VOB) may be used as a management unit for the AV stream. The VOB includes various parameters, representing the frame frequency, resolution and aspect ratio of video data and the coding mode, number of channels and coding rate of audio data, as its management information items. A decoder will refer to these management information items in decoding the associated AV stream.

When the resolution of a video signal is changed by the resolution changing unit 630, the parameters of the video data are also changed. Thus, the VOB has to be divided.

In FIG. 26, the VOB changer 651 allows the resolution changing unit 630 to change the resolution. In addition, when the resolution is actually changed, the VOB changer 651 not only provides the parameters associated with the new video to the parameter management unit 653, but also informs the unit 653 that the changer 651 has divided the VOB. In response, the parameter management unit 653 writes the respective parameters, associated with the newly produced AV stream, on the storage medium 654.

In an MPEG-2 stream produced by the image coding apparatus including the VOB changer 651, a VOB can be divided into two at a resolution change point. Accordingly, in the coded bit stream produced, GOPs are independent of each other and the VOBs can be different from each other before and after the resolution change point. It is also possible to clearly indicate the end of a VOB using the Sequence_End_Code as described for the sequence division technique.

Limiting the Number of VOBs Divided

As the VOB is repeatedly divided, the management information goes on increasing. Thus, the maximum number VOB_Max of VOBs, recordable on a single DVD-RAM disk, for example, needs to be defined in advance.

The VOB changer 651 can also count the number VOB_Num of VOBs. When the count reaches the predetermined maximum number VOB_Max, the VOB changer 651 prohibits subsequent division of VOBs. In this manner, the size of the management information can be limited to a certain size or less.

Also, the VOB changer 651 obtains a total recordable time Ts by dividing the total capacity Volume of the storage medium 654 by a target average rate Rs:

$$Ts = Volume/Rs$$

and obtains a minimum VOB time Tmin by dividing the total recordable time Ts by the maximum VOB number VOB_Max:

$$Tmin = Ts/VOB\_Max$$

Once a new VOB has started, the VOB changer 651 prohibits dividing the VOB until the period Tmin has passed. In this manner, the total number of VOBs produced by the inventive image coding apparatus can be no greater than the maximum VOB number VOB_Max. As a result, the size of the management information can be limited to a certain size or less.

For example, in recording video and audio data on a DVD-RAM with a capacity Volume of 4.7 gigabytes at a target average rate Rs of 5 Mbps, the total recordable time Ts is 7520 seconds. In this case, if the maximum VOB number VOB_Max is 999, then the minimum VOB time Tmin is 7.52 seconds. That is to say, a VOB is not divisible until 7.52 seconds has passed after the VOB was changed.

In recording multiple VOBs on a single storage medium at mutually different target average rates, the total recordable time Ts may be obtained by the lowest allowable target average rate Rs and the minimum VOB time Tmin may be obtained from the total recordable time Ts. In this manner, it is possible to ensure that the total number of VOBs on the entire storage medium does not exceed the maximum VOB number VOB_Max.

In recording an additional AV stream on a storage medium on which another AV stream has already been recorded, the VOB changer 651 obtains a remaining recordable time Ts_rest by dividing an available capacity Volume_rest of the storage medium 654 by the target average rate Rs of the coded bit stream:

$$Ts\_rest = Volume\_rest/Rs$$

and divides the remaining recordable time Ts_rest by VOB_avail, which is obtained by subtracting the number of VOBs already recorded from the maximum VOB number VOB_max:

$$Tmin = Ts\_rest/VOB\_avail$$

thereby obtaining the minimum VOB time Tmin. That is to say, once a new VOB has started, the VOB changer 651 prohibits dividing the VOB until the period Tmin has passed.

For example, suppose video and audio data should be recorded on a DVD-RAM with a capacity Volume of 4.7 gigabytes at a target average rate Rs of 5 Mbps. If video and audio data has already been recorded thereon for an hour using 100 VOBs, then Volume_rest is 2.45 gigabytes, Ts_rest is 3920 seconds, VOB_avail is 899 and Tmin is 4.36 seconds. That is to say, a VOB is not divisible until 4.36 seconds has passed after the VOB was changed.

In this example, VOB_avail is obtained by subtracting the number of VOBs already used from VOB_max. Alternatively, this number may be compared to a value obtained by multiplying VOB_max by a ratio of Ts_rest to Ts, and the smaller one may be regarded as VOB_avail. Specifically, in this example, 999×3920/7520=520. Since 520 is the smaller, the number VOB_avail of VOBs available is 520 in this case.

The number of VOBs may be counted not only when a VOB is divided due to the resolution change but also when a VOB is divided due to other factors, e.g., in accordance with an external instruction.

Embodiment 9

Figure 28:
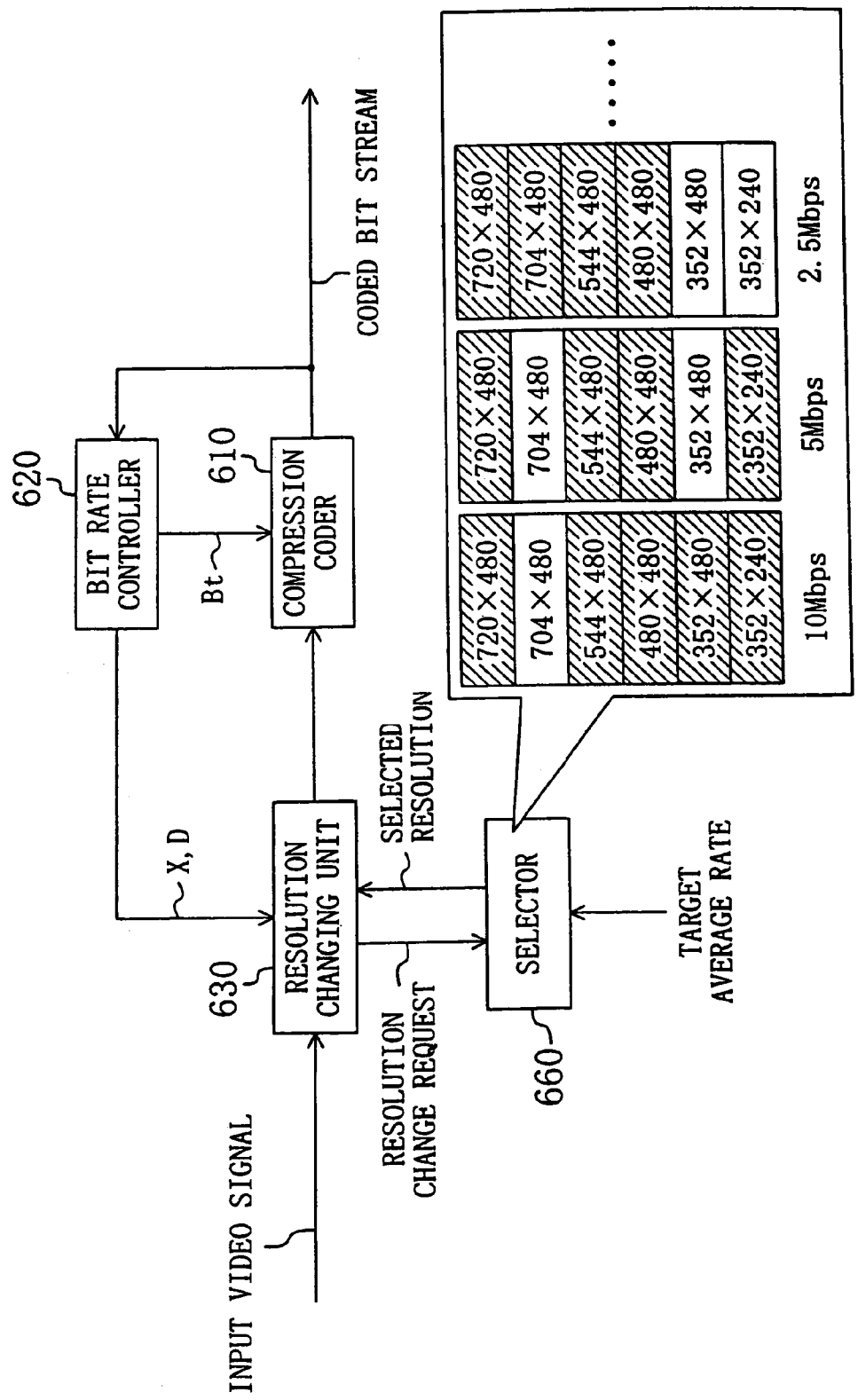
FIG. 28 is a block diagram illustrating an image coding apparatus according to a ninth embodiment of the present invention.

A ninth embodiment of the present invention will be described with reference to FIG. 28. As shown in FIG. 28, the image coding apparatus includes a selector 660 for returning a resolution to be used in response to a resolution change request issued by the resolution changing unit 630. The selector 660 receives the target average rate of a coded bit stream and includes a table of resolutions available for each target average rate received. For example, in the table shown in FIG. 28, non-hatched resolutions are available and selectable. By limiting the range of selectable resolutions in this manner, a resolution that is best suited to the target average rate can be selected. Thus, it is possible to avoid an unfavorable situation where too high a resolution selected increases the bit rate excessively or too low a resolution selected deteriorates the image quality.

FIG. 29 illustrates a modified example of the apparatus shown in FIG. 28. In this modified example, a resolution is specified and input by the operator. On receiving the operator's input, an input device 661 shown in FIG. 29 informs the selector 660 of the resolution available. For example, if the operator has specified 704×480 as the only resolution available, then the selector 660 selects no other resolution than 704×480 even when the selector 660 receives a resolution change request from the resolution changing unit 630. Thus, the resolution is not changed at all in that case. If the operator has specified 704×480 and 480×480 as two allowable resolutions, then the selector 660 instructs the resolution changing unit 630 to switch the resolution from one of these into the other. By specifying available resolutions in accordance with the operator's input, the resolution can be selected to meet the operator's preferences. The operator does not always have to specify his or her preferred resolution(s). Alternatively, the operator may just indicate whether or not he or she permits the resolution change.

As described above, the image coding apparatus according to the first embodiment of the present invention analyzes frequency components contained in an input video signal to locate a frequency band where the highest frequency component belongs, thereby selecting a most appropriate resolution. In this case, the higher the maximum frequency component, the higher the resolution selected for the input video signal. Thereafter, the input video signal has its resolution converted into the resolution selected or sampled at a frequency corresponding to the resolution selected and then compressed and coded.

The apparatus according to the second embodiment of the present invention performs low-pass filtering on an input video signal at mutually different cutoff frequencies, and compares these filtered outputs to a predefined threshold value. If the output value of at least one of the filters is greater than the threshold value, then the resolution of the input video signal is selected such that the higher the cutoff frequency of the filter, the higher the resolution. The input video signal has its resolution converted into the resolution selected or sampled at a frequency corresponding to the resolution selected and then compressed and coded.

The apparatus according to the third embodiment of the present invention calculates the activity of an input video signal, thereby selecting a most appropriate resolution based on the activity value. In this case, the larger the activity, the higher the resolution selected for the input video signal. Then, the input video signal has its resolution converted into the resolution selected or sampled at a frequency corresponding to the resolution selected and then compressed and coded.

The apparatus according to the fourth embodiment of the present invention analyzes the DCT coefficient block of an input video signal and determines the resolution by the distribution of high-frequency components in the DCT coefficient block. In this case, the resolution of the input video signal is determined such that the larger the number of blocks with high-frequency components, the higher the resolution. Then, the input video signal has its resolution converted into the resolution selected for the next frame or sampled at a frequency corresponding to the resolution selected and then compressed and coded.

The apparatus according to the fifth embodiment of the present invention calculates a complexity based on the numbers of bits generated and quantization scales for a past predetermined period, thereby selecting a most appropriate resolution depending on the magnitude of the complexity. In this case, the larger the complexity (i.e., the more difficult it is to code a video), the higher the resolution selected for the input video signal. Then, the input video signal has its resolution converted into the resolution selected for the next frame or sampled at a frequency corresponding to the resolution selected and then compressed and coded.

Thus, the image coding apparatus according to any of the first through fifth embodiments of the present invention can code input video at a resolution corresponding to the characteristics of the input video, e.g., frequency components thereof. That is to say, the number of blocks to be coded can be reduced depending on the characteristics of the input video signal. As a result, the number of bits generated can be greatly cut down with the deterioration of image quality suppressed. In addition, the inventive apparatus can also code the input video signal at a resolution corresponding to the coding complexity of the input video. Furthermore, since the resolution is changed according to the characteristics of the input video signal, the visual image quality is less likely to deteriorate even when the resolution is changed.

In particular, according to the first through third embodiments of the present invention, the resolution is determined in accordance with the characteristics of the frame being coded itself. Accordingly, even if scenes are changed in the current frame, image quality does not deteriorate.

In producing a coded bit stream at a variable rate with real-time recording ensured, it may become difficult to allocate a variable number of bits in accordance with the coding complexity of an input video signal. Even so, the image coding apparatus according to the sixth embodiment of the present invention reduces the resolution of the input video signal to continuously allocate a variable number of bits in accordance with the coding complexity. As a result, coding noise unique to DCT coding, e.g., block noise and mosquito noise, can be greatly reduced and the resultant image quality can be improved.

The apparatus according to the seventh embodiment of the present invention changes the resolution synchronously with a scene change or a still scene represented by an input video signal. Thus, the resolution change is much less recognizable to the human eyes.

In writing a produced AV stream, along with its management information, on a storage medium such as a DVD-RAM, the apparatus according to the eighth embodiment of the present invention changes the VOBs, which are management units of the AV stream, when the resolution is changed. Thus, the AV stream can be easily synchronized with the management information and the number of times the resolution is changed can be no greater than a predetermined number such that the size of the management information does not become too large.

The apparatus according to the ninth embodiment of the present invention limits the number of resolutions available for the resolution change in accordance with the target average rate or the operator's input. Thus, coding can be performed to attain such image quality as meeting the coding conditions or the operator's preferences.

What is claimed is:

1. An image coding apparatus comprising:
   compression coding means for outputting an MPEG stream by compressing and coding an input video signal;
   resolution changing means for changing a resolution of the input video signal at multiple steps; and
   selection means for selecting a resolution for use in the resolution changing means by a given target average rate.

2. An image coding apparatus comprising:
   compression coding means for outputting an MPEG stream by compressing and coding an input video signal;
   resolution changing means for changing a resolution of the input video signal at multiple steps;
   input means for receiving an operator's input; and
   selection means for selecting a resolution for use in the resolution changing means in accordance with the operator's input.

* * * * *